United States Patent [19]
Noven

[11] Patent Number: 5,884,297
[45] Date of Patent: Mar. 16, 1999

[54] SYSTEM AND METHOD FOR MAINTAINING A TABLE IN CONTENT ADDRESSABLE MEMORY USING HOLE ALGORITHMS

[75] Inventor: Geir Age Noven, Finstadjordet, Norway

[73] Assignee: Telefonaktiebolaget L M Ericsson (publ.), Stockholm, Sweden

[21] Appl. No.: 862,919

[22] Filed: May 23, 1997

Related U.S. Application Data

[63] Continuation of Ser. No. 593,497, Jan. 30, 1996.

[51] Int. Cl.$^6$ ..................................................... G06F 17/30
[52] U.S. Cl. ................................. 707/1; 707/2; 370/395; 370/397
[58] Field of Search ....................................... 370/397, 395

[56] References Cited

U.S. PATENT DOCUMENTS

| | | | |
|---|---|---|---|
| T972,003 | 7/1978 | Coleman, Jr. | 364/300 |
| 3,611,316 | 10/1971 | Woodrum | 340/172.5 |
| 4,510,567 | 4/1985 | Chang et al. | 364/300 |
| 4,758,981 | 7/1988 | Powell | 395/898 |
| 4,809,158 | 2/1989 | McCauley | 707/7 |
| 4,882,699 | 11/1989 | Evensen | 379/284 |
| 5,068,822 | 11/1991 | Lawrence | 395/898 |
| 5,089,985 | 2/1992 | Chang et al. | 395/600 |
| 5,117,495 | 5/1992 | Liu | 707/7 |
| 5,179,688 | 1/1993 | Bachman et al. | 395/600 |
| 5,204,967 | 4/1993 | Armstrong | 707/7 |
| 5,226,135 | 7/1993 | Mishina et al. | 707/7 |
| 5,270,712 | 12/1993 | Iyer et al. | 341/50 |

(List continued on next page.)

FOREIGN PATENT DOCUMENTS

| | | |
|---|---|---|
| 0 594 196 A1 | 4/1994 | European Pat. Off. . |
| WO 90/04849 | 5/1990 | WIPO . |
| WO 95/23380 | 8/1995 | WIPO . |

OTHER PUBLICATIONS

Donald E. Knuth, 3 *The Art of Computer Programming* 106–11, 406–14 & 506–49 (Addison–Wesley 1973).

Alfred V. Aho, John E. Hopcroft & Jeffrey D. Ullman, *Sorting and Storing Information in Files*, in Data Structures and Algorithms 253–260 & 361–368 (Addison–Wesley 1983).

Stephen C. Farkouh, *Managing ATM–Based Broadband Networks*, 31 IEEE Communications 82–86 (IEEE May 1993).

Primary Examiner—Thomas G. Black
Assistant Examiner—Diane D. Mizrahi
Attorney, Agent, or Firm—Jenkens & Gilchrist, P.C.

[57] ABSTRACT

A system and method for the efficient execution of interleaved look-up and edit request to a connection table in an ATM exchange is described. This global address of an ATM cell is mapped to a smaller, equipment-specific local address using a connection table stored at each local exchange. When an ATM cell arrives at an ATM exchange, a look-up request is sent to the connection table along with the global address values. Since the database operating system accords the highest priority to look-up requests, queries to the connection table for the local address of an ATM cell results in the temporary suspension of execution of all other tasks. A binary search algorithm is used for executing the interrupt-driven local address look-up request. Entries in the connection table continually need to be added, deleted, replaced or verified. Efficient execution of these tasks is facilitated by maintaining a database in a sorted order using an enhanced bubblesort algorithm. The entries in the connection table are interspersed with dummy data records called holes. Insertion of new connection entries using the bubblesort algorithm is speeded up, considerably speeds up by the presence of holes near the desired intersection point for the new entries. A hole distribution process operates in the background to distribute the holes for optimal performance. Sort requests are interleaved with the look-up requests in such a way as to permit look-up requests to preempt sort requests in execution priority without imposing additional computational costs because of the interruption.

34 Claims, 19 Drawing Sheets

U.S. PATENT DOCUMENTS

| | | | |
|---|---|---|---|
| 5,274,805 | 12/1993 | Ferguson et al. | 707/7 |
| 5,321,843 | 6/1994 | Shoji et al. | 395/800 |
| 5,323,389 | 6/1994 | Bitz et al. | 370/60 |
| 5,355,474 | 10/1994 | Thuraisngham et al. | 395/600 |
| 5,379,420 | 1/1995 | Ullner | 707/6 |
| 5,386,583 | 1/1995 | Hendricks | 707/7 |
| 5,396,622 | 3/1995 | Lee et al. | 707/7 |
| 5,414,701 | 5/1995 | Shtayer et al. | 370/58.2 |
| 5,414,704 | 5/1995 | Spinney | 370/60 |
| 5,414,842 | 5/1995 | Archer et al. | 707/7 |
| 5,425,027 | 6/1995 | Baran | 370/69 |
| 5,440,734 | 8/1995 | Wager | 707/7 |
| 5,467,349 | 11/1995 | Huey et al. | 370/60.1 |
| 5,487,164 | 1/1996 | Kirchhofer et al. | 707/7 |
| 5,490,269 | 2/1996 | Cohn et al. | 707/7 |
| 5,493,566 | 2/1996 | Ljungberg | 370/60 |
| 5,638,377 | 6/1997 | Jean-Paul | 370/92 |

| ADDRESS | VPI | VCI | PATH | |
|---|---|---|---|---|
| 0 | 5A6 | FFFF | 1 | |
| 1 | 5BB | FFFF | 1 | |
| 2 | 791 | 7000 | 0 | |
| 3 | 791 | 7001 | 0 | |
| 4 | 791 | 7002 | 0 | |
| 5 | A56 | FFFF | 1 | <-j |
| 6 | A56 | FFFF | 1 | <-i |
| 7 | FFF | FFFF | 1 | <-t |
| 8 | FFF | FFFF | 1 | |

FIG. 11A

| ADDRESS | VPI | VCI | PATH | |
|---|---|---|---|---|
| 0 | 5A6 | FFFF | 1 | |
| 1 | 5BB | FFFF | 1 | |
| 2 | 791 | 7000 | 0 | |
| 3 | 791 | 7001 | 0 | |
| 4 | 791 | 7002 | 0 | <-j |
| 5 | 791 | 7002 | 0 | <-i |
| 6 | A56 | FFFF | 1 | |
| 7 | FFF | FFFF | 1 | <-t |
| 8 | FFF | FFFF | 1 | |

FIG. 11B

| ADDRESS | VPI | VCI | PATH | |
|---|---|---|---|---|
| 0 | 5A6 | FFFF | 1 | |
| 1 | 5BB | FFFF | 1 | <-j |
| 2 | 5BB | FFFF | 1 | <-i |
| 3 | 791 | 7000 | 0 | |
| 4 | 791 | 7001 | 0 | |
| 5 | 791 | 7002 | 0 | |
| 6 | A56 | FFFF | 1 | |
| 7 | FFF | FFFF | 1 | <-t |
| 8 | FFF | FFFF | 1 | |

FIG. 11C

| ADDRESS | VPI | VCI | PATH | |
|---|---|---|---|---|
| 0 | 5A6 | FFFF | 1 | |
| 1 | 5BB | FFFF | 1 | <-j |
| 2 | 5C0 | 0001 | 0 | <-i |
| 3 | 791 | 7000 | 0 | |
| 4 | 791 | 7001 | 0 | |
| 5 | 791 | 7002 | 0 | |
| 6 | A56 | FFFF | 1 | |
| 7 | FFF | FFFF | 1 | <-t |
| 8 | FFF | FFFF | 1 | |

| Adr | VPI_VCI | Con | Hole |
|---|---|---|---|
| 0 | 5 | 3 | 0 |
| 1 | 7 | 1 | 1 |
| 2 | 9 | 2 | 1 |
| 3 | 10 | 0 | 0 |
| 4 | 12 | 6 | 0 |
| 5 | 15 | 7 | 1 |
| 6 | 20 | 4 | 0 |
| 7 | 24 | 5 | 0 |
| 8 | 26 | 9 | 0 |
| 9 | 38 | 13 | 1 |
| 10 | 40 | 8 | 0 |
| 11 | 62 | 10 | 1 |
| 12 | 66 | 12 | 0 |
| 13 | 70 | 15 | 0 |
| 14 | 80 | 11 | 1 |
| 15 | 99 | 14 | 1 |

FIG. 16B

| Adr | VPI_VCI | Con | Hole |
|---|---|---|---|
| 4 | 12 | 6 | 0 |
| 5 | 15 | 7 | 1 |
| 6 | 20 | 4 | 0 |
| 7 | 24 | 5 | 0 |
| 8 | 26 | 9 | 0 |
| 9 | 38 | 13 | 1 |
| 10 | 40 | 8 | 0 |

FIG. 16C

| Adr | VPI_VCI | Con | Hole |
|---|---|---|---|
| 4 | 12 | 6 | 0 |
| 5 | 15 | 7 | 1 |
| 6 | 20 | 4 | 0 |
| 7 | 24 | 5 | 0 |
| 8 | 26 | 9 | 0 |
| 9 | 38 | 13 | 1 |
| 10 | 40 | 8 | 0 |

FIG. 16D

| Adr | VPI_VCI | Con | Hole |
|---|---|---|---|
| 4 | 12 | 6 | 0 |
| 5 | 20 | 4 | 0 |
| 6 | 20 | 7 | 1 |
| 7 | 24 | 5 | 0 |
| 8 | 26 | 9 | 0 |
| 9 | 38 | 13 | 1 |
| 10 | 40 | 8 | 0 |

FIG. 16E

| Adr | VPI_VCI | Con | Hole |
|---|---|---|---|
| 4 | 12 | 6 | 0 |
| 5 | 20 | 4 | 0 |
| 6 | 22 | 7 | 0 |
| 7 | 24 | 5 | 0 |
| 8 | 26 | 9 | 0 |
| 9 | 38 | 13 | 1 |
| 10 | 40 | 8 | 0 |

FIGURE 16

SYSTEM AND METHOD FOR MAINTAINING A TABLE IN CONTENT ADDRESSABLE MEMORY USING HOLE ALGORITHMS

This application is a continuation of Ser. No. 08/593,497 filed Jan. 30, 1996.

CROSS-REFERENCES TO RELATED APPLICATIONS

This U.S. patent application contains subject matter relating to a co-pending U.S. Patent Application entitled "System and Method for Database Management in ATM Exchanges," Ser. No. 08/593,497, filed on Jan. 30, 1996, in the name of Geir Åge NOVEN, who is also the inventor of the present invention. The material disclosed in the specification of the above-identified earlier-filed parent patent application is hereby expressly incorporated by reference herein. The earlier-filed U.S. patent application and the present U.S. patent application have been or will be assigned to Telefonaktiebolaget LM Ericsson (publ).

DESCRIPTION

1. Technical Field of the Invention

The invention relates to computing and electronic data switching systems, and more particularly, to efficient techniques for maintaining a content-addressable memory such as one used to manage a connection information database in an Asynchronous Transfer Mode (ATM) system.

2. Description of Related Art

The demand for telecommunications services has been growing at an ever-increasing rate. In order to meet this demand, telecommunications network operators and suppliers have had to continuously upgrade the traffic carrying capacity of both their circuits as well of as the switch nodes interconnecting those circuits. Moreover, the demand for ordinary voice telephone service is becoming a decreasingly smaller part of the overall traffic demand in comparison to other telecommunications services such as data communications between computers, graphical image transmissions, video-conferencing and similar broadband services.

Current and future telecommunications subscribers, both residential and business, will be connected, via common accesses, to a web of broadband networks operating at data rates of 150 megabits per second or above and which can support a wide range of different types of broadband services. Broadband networks may be generally defined as those which support user services requiring bit transfer rates substantially in excess of one megabit per second.

In general, broadband networks are likely to be built using Asynchronous Transfer Mode (ATM) technology as the underlying type of transport and switching technology. Broadband Integrated Services Digital Networks (B-ISDN), employing ATM technology can offer users the flexibility and capacity necessary to support diverse telecommunication services ranging from basic voice telephone service to high speed data transfer, video telephony, and high-quality television signal distribution. As further described below, ATM technology relies upon the compartmentalization of data into packets or cells which are transmitted and switched as individual units through the various nodes in the broadband network.

Current large telephone central offices may serve up to 100,000 customers. Based upon such a large number of terminals, a future B-ISDN central office may be required to operate at a switching capacity of up to one terabit per second ($10^{12}$ bits per second) or greater. Assuming that each customer is served with a B-ISDN line operating at the design throughput level of 155.52 megabits per second, an ATM exchange switch needs to be able to handle a throughput in excess of 15 terabits per second.

Data is transmitted in ATM systems in the form of "cells" that are 53 octets long. Each ATM cell comprises a five octet "header" segment followed by a forty-eight octet "payload" segment. The header segment of an ATM cell contains information relating to the routing of the data contained in the payload segment. The header segment also contains traffic control information. Eight or twelve bits of the header segment contain the Virtual Path Identifier (VPI), and sixteen bits of the header segment contain the Virtual Channel Identifier (VCI).

Each ATM exchange translates the abstract routing information represented by the VPI and VCI bits into the addresses of physical or logical network links and routes each ATM cell appropriately. Since, on the average, the time duration of activity on each virtual path and each virtual channel is longer than the length of a single cell, it is computationally more efficient if the translation tables that correlate the VPI and VCI information to physical or logical network links are stored in a database in the ATM exchange.

The entries in the database of connection information need to be added, revised or deleted every time a connection is added, modified or taken down. These operations are collectively referred to hereinafter as database editing operations. Further, every time an ATM cell is received, the VPI and VCI values in the header segment of that cell need to be translated into routing information pertaining to physical or logical network links. This operation is referred to hereinafter as a database look-up operation.

During the operation of an ATM exchange, the connection information database (also referred to herein as a connection table) needs to be concurrently available for both editing as well as for look-up. Under ordinary operating conditions, look-up requests to the database are likely to be much more numerous than database editing operations. However, database editing operations are generally more complex than database look-up operations. Computational efficiency considerations mandate that the connection table be organized in such a manner that database look-up requests are handled expeditiously without letting any pending database editing operations get substantially backlogged.

An ATM link operating at 155.52 megabits per second (the STM-1 rate) handles over 365,000 ATM cells every second. Since an ATM exchange is likely to have multiple incoming and outgoing links operating at the STM-1 rate, it is possible for the connection table to get over one million look-up requests a second. Since database look-up requests are so frequent, it is important for the database to be maintained in sorted order, especially for the efficient operation of the search algorithm used for handling look-up requests. For example, if the cell-bandwidth-averaged duration of each connection were one minute, then it follows that about one million entries in the connection table would have to be replaced or revised once every minute. Since frequent database edit operations are thus likely, there is a great need for efficient techniques to manage the ATM connection table.

It is well known to use a search technique called the binary search technique to locate an item in a sorted list. See, e.g., Donald E. Knuth, 3 THE ART OF COMPUTER PROGRAMMING 406–14 (Addison-Wesley 1973). The principal advantages of a binary search algorithm are its low worst-case running time and the simplicity of implementing the algorithm in hardware. The disadvantage of a binary search algorithm is a dependence of the algorithm on a sorted data-sequence. The binary search technique has been used to implement the look-up algorithm in the present invention.

It is likewise well known to use a sorting technique called the bubblesort technique to efficiently sort items in a list. See, e.g., Donald E. Knuth, 3 THE ART OF COMPUTER PROGRAMING 106–11 (Addison-Wesley 1973). An enhanced bubblesort technique has been used in the preferred embodiment of the editing algorithm of the present invention.

The principal advantages of the binary search and the bubblesort algorithms include the fact that these algorithms may be easily implemented using Digital Signal Processors (DSPs) or Application Specific Integrated Circuits (ASICs) Further, these algorithms are very memory-conserving, a factor that favors total system integration on a single chip. In addition, the use of these algorithms permit the system to freely use the entire 28-bit global addressing range of ATM cells. Thus, they side-step any possibility of placing restrictions on the addressing range, and also avoid the risk of rejection of a connection set-up request due to one or more collisions during the execution of a hashing algorithm.

Yet another advantage of these techniques is the resulting predictability of the maximum access time since any compression will be done in a limited number of cycles. These algorithms can also be easily extended or reduced to operate on any number of connections to fit specific network needs.

Since these schemes rely on a sorted table, we also obtain some possible future extensions, such as being able to support VP and VC ranging. The concept of ranging is explained in greater detail later in this specification.

ATM standardization committees have not proposed any specific methods or mechanisms for managing the connection table in ATM systems. The principal alternative to the database management technique that is disclosed in the present invention is to use "hashing". Hashing is an effective method for searching and updating tables used in data communications networks. Hashing involves the translation of database entries using a hash function into values spanning a compact range. Hashing yields an average-case searching time and updating time which is superior to most other methods operable on a table of limited size. Hashing can reduce the storage needed for storing database entries and may also permits relatively fast searching. A detailed description of hashing and hash functions can be found in Donald E. Knuth, 3 THE ART OF COMPUTER PROGRAMING 506–49 (Addison-Wesley 1973).

Therefore hashing would appear to be a natural alternative to the binary search and bubblesort techniques. However, the binary search and bubblesort techniques have proved to be superior to hashing and other similar database management techniques for several reasons. For example, hashing is memory-inefficient as it typically requires 8–32 times the memory requirements of the present invention. Further, the worst-case search, storage and/or retrieval times for the hashing technique can be indeterminate whenever multiple entries map (at least initially) to the same hashed value.

In addition, hashing poses the risk of collisions during the set-up phase due to the trade-off between the possibility of collision and memory oversizing. It should be noted that depending on the hashing scheme used, the system may exhibit a longer access time than with the system and method of the present invention. Consequently, hashing cannot be used in real-time processing applications, since the connection look-up requests may get ignored or delayed. Finally, it should be noted that hashing does not inherently support ranging.

Hashing techniques show themselves in the best light when their performance is evaluated using probabilistic measures. However, the performance of hashing algorithms in "worst-case" scenarios is quite poor. For example, a new entry may fail to be entered, or the retrieval time for an entry may be too long to permit "on the fly" look-up.

In time-critical telecommunications applications, it is important for search, storage and retrieval times to be bounded. The method and system of the present invention is superior to hashing techniques because its memory requirements id are quite modest and because the algorithm is relatively simple. Because of the limited storage and power requirements, it is relatively easy to implement the present method on a custom chip.

It should be noted that neither the binary search nor the traditional bubblesort methods are per se new. Variants of the modified bubblesort technique disclosed in the earlier-filed U.S. patent application Ser. No. 08/593,497, also appear to be known to some practitioners in the art. However, there appear to be no patents or printed publications disclosing the enhanced bubblesort technique of the present invention. There appear to be no teachings suggesting the combined use of the binary search and the enhanced bubblesort techniques to maintain a sorted list in a content addressable memory or to manage a connection table in an ATM exchange.

WIPO International Publication Number WO 95/23380 entitled "BIT MAPPING APPARATUS AND METHOD" invented at IBM, discloses a fast n-bit to k-bit mapping or translation method and apparatus that avoids the use of content-addressable memories (CAMs).

WIPO International Publication Number WO 90/04849 entitled "MEMORY STRUCTURE AND METHOD OF UTILIZATION" invented by David Siu Fu CHUNG, discloses a memory structure comprising a plurality of contiguous memory locations which can operate as a stack or list. The contiguous memory locations are subdivided into contiguous sub-structures each being associated with at least one buffer memory location that permits shuffle operations to be performed in parallel on the stack or list.

However, the Chung patent application makes no mention, either directly or indirectly, of the concept of a hole in the memory structure. The approach disclosed in Chung bears certain similarities to the modified bubblesort technique detailed in the earlier-filed U.S. patent application Ser. No. 08/593,497, where a continuous block of data records is moved up or down in memory every time a connection is added or deleted.

However, it should be noted that the Chung patent uses additional hardware so that instead of moving a block of N elements in N cycles, as in the earlier-filed related patent application, a block of N elements is moved in M cycles, where the constant M is the number or records in each sub-structure. M is a hardware dependent constant, that is equal to 4 in the Chung reference. The movement of N elements which was done serially in the earlier-filed related patent application is done in parallel within each sub-structure in the Chung reference.

After M cycles of parallel, internal shifting, the "carry" between the sub-structures is transferred, so that the total time for creating a placeholder for inserting a new data record is M+L clock cycles in Chung. It also takes a similar period of time to remove a data record and compact the blocks above and below into a single contiguous block. It should also be noted that during the M+L cycle duration of the shuffle, the contents of the memory are inaccessible as it is in an unsearchable state for a period of time, disabling any interleaved search/update algorithms that may be operating in the interim.

Chung suggests the entry of a new data record by finding the insertion point in the ordered structure, and creating a dummy data record there by block moving part of the structure. In contrast, the subject invention finds the insertion point, locates the nearest "hole," moves the "hole" to the desired insertion point and writes over it with a new data record.

Regarding the removal of an identified data record, Chung closes the ordered structure by moving down the higher level block. In contrast, the system and method of the present invention removes an identified data record in the ordered structure by making it into a "hole."

Given that they do not use the "hole" concept, neither the Chung reference nor the IBM reference need a "background process" to distribute the holes, but this is an integral part of the subject patent application.

In one aspect, Chung may be classified as a hardware patent since it discloses a technique for designing a storage element comprising multiple small RAM blocks, each with its own little state machine and buffer storage. The same algorithms as in the earlier-filed related patent application may be implemented very efficiently, but at the cost of requiring a lot of parallel processing hardware in addition to the storage elements themselves.

Both the present invention disclosure and the earlier-filed related patent application are approaches that improve upon the Chung and the IBM references. While Chung more or less retains the "old" algorithmic approach but improves the functionality of the hardware to speed them up, the system and method of the present invention introduces a more sophisticated algorithm, which means reconsidering the search-algorithm, the connect-algorithm and the disconnect-algorithms, and introducing a preconditioning algorithm for keeping the holes well distributed.

Since all approaches aim to keep the data sorted for easy associative access, all methods implement content-addressable (or key-addressable) memory, as opposed to location-addressable memories (i.e., conventional RAMs).

It would be desirable to build upon the combination of these two relatively well-known solutions to create an ATM database management technique that is both simple as well as computationally efficient in its operation and use of system resources. It would additionally be desirable to permit the efficient multiplexing and demultiplexing of ATM cell streams.

SUMMARY OF THE INVENTION

Therefore, it is a primary object of the present invention to permit the efficient execution of interleaved look-up and edit requests received by the connection table in an ATM exchange.

In one embodiment of the present invention, the 24-bit or 28-bit global address of an ATM cell is mapped to a smaller, equipment-specific local address that is 12-bits long. This mapping is performed using a connection table stored in each local exchange. When an ATM cell arrives at an ATM exchange port, an interrupt or other signal is generated that causes a look-up request to be sent to the connection table along with the global address values as parameters. When the connection table receives a look-up request with these parameters, it temporarily suspends whatever other tasks it is performing and determines the local address corresponding to the global address values received. Thus the system and method of the present invention facilitates the interrupt-driven ("on the fly") look-up of the local address of each arriving ATM cell. A modified binary search algorithm is used for executing the address look-up requests.

Entries in the connection table continually need to be added, deleted, replaced or verified. The system and method of the present invention aids in the execution of these database management tasks. Efficient operation of these management tasks is made easier if the database is continuously maintained in sorted order. It should be noted that keeping the database in sorted order is not only efficient, but is also essential for the proper (interleaved) operation of the look-up and the management algorithms of the present invention. In one embodiment of the system and method of the present invention, an enhanced bubblesort algorithm is used for sorting the entries in the connection table.

Sort requests using this enhanced bubblesort algorithm can be interleaved with look-up requests using a modified binary search algorithm in a manner that permits look-up requests to preempt sort requests in execution priority while permitting interrupted sort requests to be resumed without imposing additional computational costs because of the interruption.

In one aspect, the present invention relates to a system and method for managing a connection table in an Asynchronous Transfer Mode (ATM) telecommunications exchange. The global address of an ATM cell is first mapped to a local address that is specific to an ATM exchange port. A modified binary search algorithm is then used to look-up entries in the database. An enhanced bubblesort algorithm is used to add data entries to the database.

The connection table is first populated with a number of dummy data records called "holes". The data entry algorithm performs its function by moving a dummy data record from the nearest "hole" to the correct position in the database while constantly retaining the database in a fully sorted state. An enhanced bubblesort algorithm is used to delete data entries in the database. The data deletion algorithm is capable of deleting data entries while maintaining the database in a fully sorted order. A background process ensures an adequate population of holes is available at locations near where new records need to be added. The background process also recycles disused records into holes.

In one aspect, the present application describes a system and method for adding a new connection entry to a connection table in an Asynchronous Transfer Mode (ATM) exchange. The connection table contains multiple data records. Each of these data records relates global connection identifiers of a group of ATM cells to a specific local connection in an ATM exchange.

In the preferred embodiment of the present invention, the global address of a group of ATM cells that all belong to a single connection is first mapped to a specific local address of the local ATM exchange. A sorted connection table is then created that correlates the global address of ATM cells belonging to a single connection to its unique local address. Several "holes" are then distributed throughout the connection table, where each "hole" is a dummy data record that represents a local address that is not currently active. The sub-fields of the hole data records contain fictitious data that ensure that the connection table remains in sorted order. Entries corresponding to a new connection are added to the connection table using a data insertion algorithm.

The data insertion algorithm first identifies the appropriate insertion point in the sorted connection table for a new connection entry using a look-up algorithm. In one embodiment of the present invention, the look-up algorithm is a binary-search algorithm. Next, the insertion algorithm locates the nearest hole to the desired insertion point. An enhanced bubblesort algorithm is then used to reposition the nearest hole to the desired insertion point without affecting the sort order of the connection table. Finally, the new connection entry is then written over the repositioned hole.

In another aspect, the present application describes a system and method for deleting a connection entry from a connection table using a data deletion algorithm. Like the data insertion algorithm, the data deletion algorithm first invokes the look-up algorithm to locate the connection entry that is to be deleted from the connection table. The data deletion algorithm then converts the connection entry targeted for deletion into a hole.

In an additional aspect, the present application describes a system and method for managing and maintaining a connection table where the processing resources need for adding new entries is reduced by using a hole distribution algorithms to monitor the pattern of distribution of holes within the connection table. The use of a hole distribution algorithm permits the connection table manager to operate efficiently even when the probability distribution of new connection entries varies dynamically compared to the probability distribution of the connection entries that are active at any given time.

The hole distribution algorithm runs as a low-priority background process that continually scans the connection table and adjusts the positions of the holes. In the preferred embodiment of the present invention, the look-up process is given the highest execution priority followed by the data insertion process and the data deletion process. The hole distribution algorithm is given the lowest execution priority.

In the preferred embodiment of the present invention, the connection table is implemented as a circular table. This reduces the bunching up of holes at the top and bottom of the table as could happen if the connection table had been implemented as a linear table.

BRIEF DESCRIPTION OF THE DRAWINGS

A more complete understanding of the method and system of the present invention may be obtained by reference to the detailed description of the preferred embodiments that follows, taken in conjunction with the accompanying drawings, wherein:

FIGS. 11(A–D) illustrate the stages in the data entry sequence for a database containing six data records in a related invention;

FIGS. 16(A–E) provide an exemplary illustration of the stages in the data entry sequence in the present invention for a connection table having sixteen records;

DESCRIPTION OF THE PREFERRED EMBODIMENT

Telecommunications Networks

Figure 1:
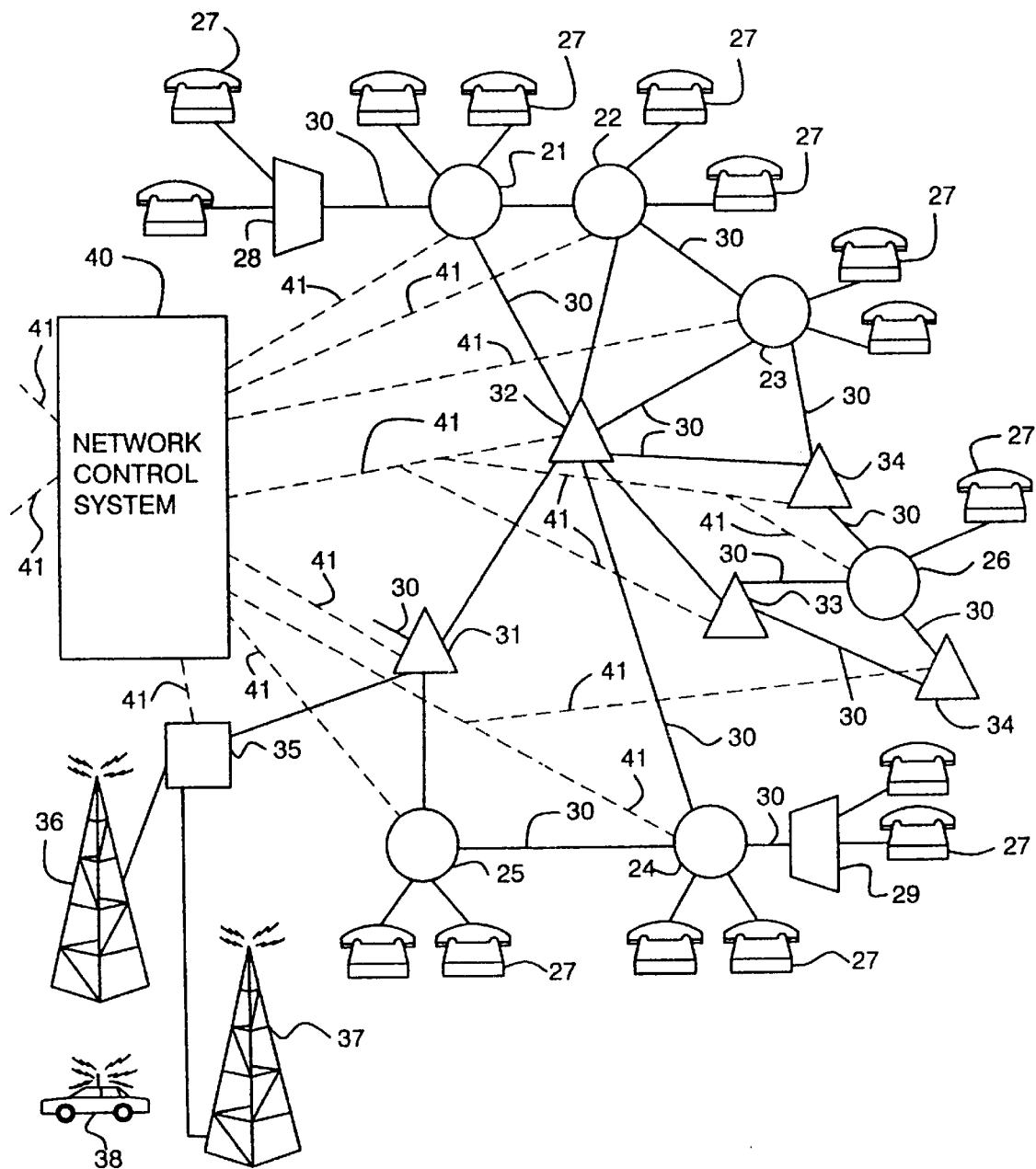
FIG. 1 is a block diagram of an illustrative telecommunications network within which the data switching system of the present invention may be employed.

Referring first to FIG. 1, there is shown an illustrative schematic diagram of a conventional public telecommunications network including a plurality of local exchanges 21 to 26, each of which have a plurality of local subscribers connected thereto and represented by telephone instruments 27. Two of the local exchanges 21 and 24 are represented as having remote subscriber multiplex stages 28 and 29 associated therewith which, in turn, have local customers 27 connected thereto. The network of FIG. 1 also includes a plurality of trunking exchanges 31 to 34 which serve primarily to interconnect various local exchanges with one another and to provide routes between various parts of the network. Trunk exchange 31 is shown connected to a mobile exchange 35 which includes a pair of illustrative base stations 36 and 37 serving a plurality of mobile radio telephone subscribers represented at 38.

In addition, other telecommunications services such as databases and intelligent networks may also be connected to various ones of the exchanges shown. Between each of the exchanges 21 to 35 in the network, there are shown a plurality of communication paths 30, each of which may comprise a plurality of communication circuits, including cables, optical links or radio links for carrying voice and/or data communication between the various exchanges within the network.

The network of FIG. 1 also includes a network control system 40 which is connected to each of the exchanges 21 to 35 within the network by means of communication links 41 (represented by dotted lines) for the transmission of control signals to each exchange and for the reception of traffic data from each exchange. The network control system 40 issues commands to dynamically reconfigure the communication paths within the various traffic routes of the network as well as to control the alarm systems within the exchanges of the network in order to fine tune the alleviation of congestion conditions within the network.

ATM System Concepts

As discussed above, numerous changes are currently taking place within the public telecommunications transport networks being implemented. Operators of public telecommunications networks have long sought to deploy a single type of technology to handle the transport and switching of all types of telecommunications services within a common infrastructure. One such technology is Asynchronous Transfer Mode (ATM) technology.

ATM is currently being implemented in an attempt to satisfy these needs by creating a bearer telecommunications network which has substantial "bandwidth granularity" and which is capable of coping with very high bandwidth connections. The term "bandwidth granularity" refers to a characteristic of a network that can handle calls whose bandwidth requirements continually vary over a wide range during the duration of a call.

The use of ATM technology in the public telecommunications network provides the capabilities of common switching and transport for related services, increased bandwidth granularity, support of variable-bit-rate services, and support of multimedia services. Because of these features, ATM has been chosen by the International Telecommunications Union (ITU) (formerly known as the International Telegraph and Telephone Consultative Committee (CCITT)) as the core technology for broadband ISDN (B-ISDN) services. This is despite the disadvantages of ATM, including transit delays for low speed isochronous services, added complexity within a network, and the introduction of new performance parameters (such as cell-loss and congestion), with which the system of the present invention deals, as will be further set forth below.

An ATM network may be implemented using either plesiochronous digital hierarchy (PDH) or synchronous digital hierarchy (SDH), or both. Moreover, pure ATM may be used as the bearer for a network whenever the limitations arising from multiple conversions between ATM and STM (synchronous transfer mode) and the resultant performance degradations can be dealt with.

Figure 2:
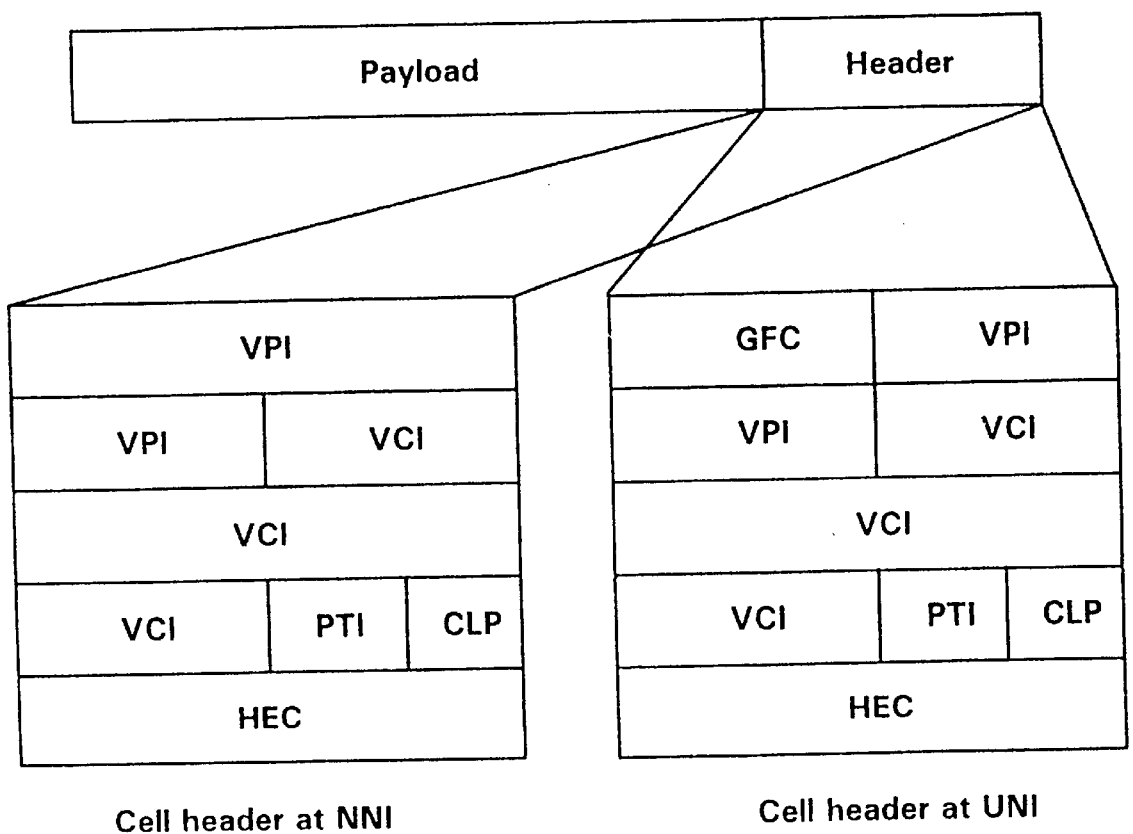
FIG. 2 is a block diagram illustrating an exemplary ATM cell structure.

The ATM cell structure shown in FIG. 2 is at the heart of ATM technology. An ATM cell has a fixed length of 53 bytes, or octets, divided into a 5-octet header and a 48-octet information field (also known as the payload). The ATM cell header is structured as a number field and one of its main functions is to assist in routing the ATM cell from the point of origin to the point of destination through one or more switching nodes. The information held in each ATM cell is kept relatively small in order to reduce the size of the internal buffers in the switching nodes and to limit the queuing delays in those buffers. ATM operates in a connection-oriented mode. This is important from a modeling viewpoint since it makes it possible to use the results of well-established circuit-switched mathematical models to optimize the allocation and control of network resources.

The principal function of the ATM cell header is the identification of the virtual connection. Routing information within the ATM cell is contained within two fields: a virtual path identifier (VPI), which determines which virtual path the ATM cell belongs to, and a virtual channel identifier (VCI), which determines which virtual channel in the virtual path the cell belongs to.

A virtual channel is a dynamically allocable end-to-end connection. Optical transmission links are capable of transporting hundreds of megabits per second, whereas virtual channels may fill only a few kilobits per second of a link. Thus, a large number of simultaneous virtual channels can be supported on a single transmission link.

A virtual path, on the other hand, is a semi-permanent connection between endpoints. Each of virtual paths can transport a large number of simultaneously-connected virtual channels. Since a large group of virtual channels are handled and switched together as a single unit, the total processing requirements of a virtual path are less than that of a virtual circuit, and consequently there is faster processing per (virtual) circuit, resulting in a significantly more efficient use of network resources. The network management of virtual paths is relatively simple and efficient.

As illustrated in FIG. 2, the ATM cell header is slightly different at the user-network interface (UNI) compared with the network-node interface (NNI). The UNI contains four bits for generic flow control (GFC) and is used to ensure fair and efficient use of available capacity between a terminal and the network. A payload type indicator (PTI) field is used to indicate whether an ATM cell contains user information or special network information, e.g., for maintenance purposes. A cell loss priority (CLP) field encodes a two-level priority and is used when it becomes necessary to discard cells because of network conditions. The header information is protected by a check sum contained within the header error control (HEC) field.

The use of ATM cells permits the information transfer rate to adapt to the actual service requirements. Depending upon the capacity required, the number of cells per unit of time can be increased up to the transmission bit-rate limit of the physical medium used to carry the data. In addition to data cells there are also cells for signaling and maintenance and idle cells. Signaling cells are used between an end user in the network, or between nodes in the network and their function is to set-up a service, e.g., a connection. Maintenance cells provide supervision of the ATM layer while idle cells are used to fill the transmission capacity up to the rate of the transmission medium.

Figure 3:
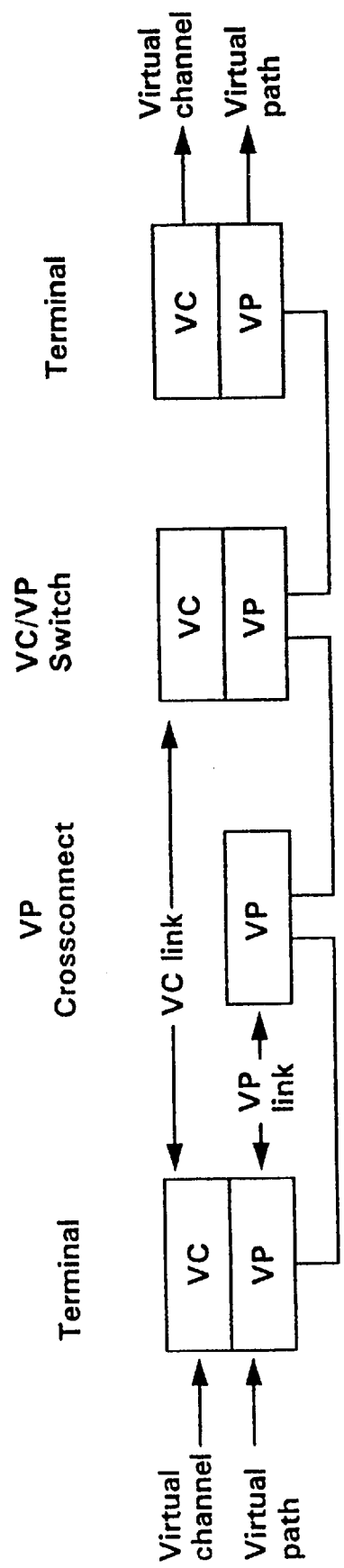
FIG. 3 is a block diagram illustrating a number of interconnected virtual paths and virtual channels within an ATM network.

Referring to FIG. 3, there is shown a block diagram illustrating the switching and cross-connection of virtual channels and virtual paths within an ATM link. From the viewpoint of a switch designer, "VP switching" refers to the switching of an ATM cell using only the upper part of the identifier field, that is, the shorter field (VPI). In contrast, in "VP/VC switching" the entire identifier field (i.e., both the VPI and the VCI) are used to switch an ATM cell.

A VP/VC path consists of a plurality of interconnected VP/VC lengths. Switching and cross-connection can be performed at either the VP or the VC level. The virtual path identifier (VPI) and the virtual channel identifier (VCI) define a two-tier handling and routing structure within the ATM circuitry. From the network architectural standpoint, a virtual path (VP) is a bundle of individual connections, a type of "highway" in the route map of an ATM network. One important task in network management is to allocate the right amount of transmission capacity to each such highway (i.e., a virtual path) in order to optimize network performance. This optimization task is the objective of bandwidth management or virtual path dimensioning techniques.

Figure 4:
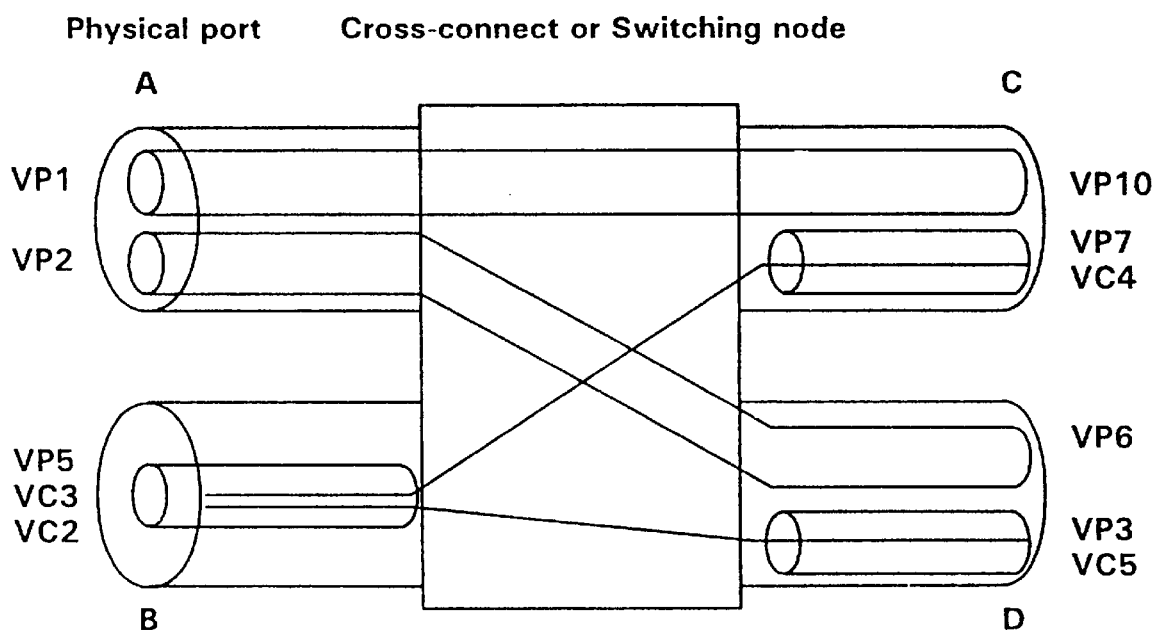
FIG. 4 is a block diagram illustrating the cross-connection and switching of virtual paths and virtual channels within an ATM network.

FIG. 4 illustrates the concepts of virtual path and virtual channel cross-connection and switching. The virtual path identifier (VPI) and virtual channel identifier (VCI) values are only valid for a specific link. In each cross-connect or switch, new VPI/VCI values are assigned to the cell with the combination of physical port and VPI/VCI values providing the identification for the ATM cell. The routing of an exemplary ATM cell is then performed, with the aid of translation tables such as that illustrated in TABLE 1.

TABLE 1

| CONNECTED-FROM PORT | VPI | VCI | CONNECTED-TO PORT | VPI | VCI |
|---|---|---|---|---|---|
| A | 1 | — | C | 10 | — |
| A | 2 | — | D | 6 | — |
| B | 5 | 3 | C | 7 | 4 |
| B | 5 | 2 | D | 3 | 5 |

An ATM cell is the basic multiplexing unit within an ATM transport system, with each cell or information unit containing its own connection and routing information. This feature enables direct multiplexing or demultiplexing of service channels wherein each channel may carry different bit-rates. Each ATM cell is identified and routed by information contained in the header within the virtual path identifier (VPI) and virtual channel identifier (VCI) fields. As mentioned above, a virtual path (VP) is a bundle of multiplexed circuits between two termination points, e.g., switching systems, Local Area Network (LAN) gateways, or private network gateways. A VP provides a direct logical link between virtual path terminations, with the VPI value identifying the particular virtual path.

As also mentioned above, the virtual connection concept used within ATM technology allows multiple virtual channels (VCs) to be handled as a single unit. Virtual channels with common properties, such as those with the same quality of service (QoS), can be grouped together in bundles that can be transported, processed and managed as one unit. This flexible bundling simplifies the operation and maintenance of an ATM system.

Both virtual paths and virtual channels can be used to provide semi-permanent paths within the ATM network. Routes are established and released from an operation support system by the setting of "path connect tables" in the cross-connect equipment or in the multiplexers along a path. Virtual channels can also be used for on-demand switching with connections being established by signaling either between a user and the network or within the network.

One important characteristic of ATM technology relates to its protocol architecture and is built around the so-called "core-and-edge" principle. The protocol functions specific to the information type being transported, such as retransmissions, flow control, and delay equalization, are performed in terminals at the "edges" of the ATM network. This leaves an efficient, service-independent "core" network, that only includes simple cell-transport and switching functions. Within the ATM nodes in this "core", there is no error checking of the information field nor is there any flow control. The cell information is simply read, the HEC is then used to correct single-bit errors that might affect the address and the cell is then switched towards its destination.

Figure 5:
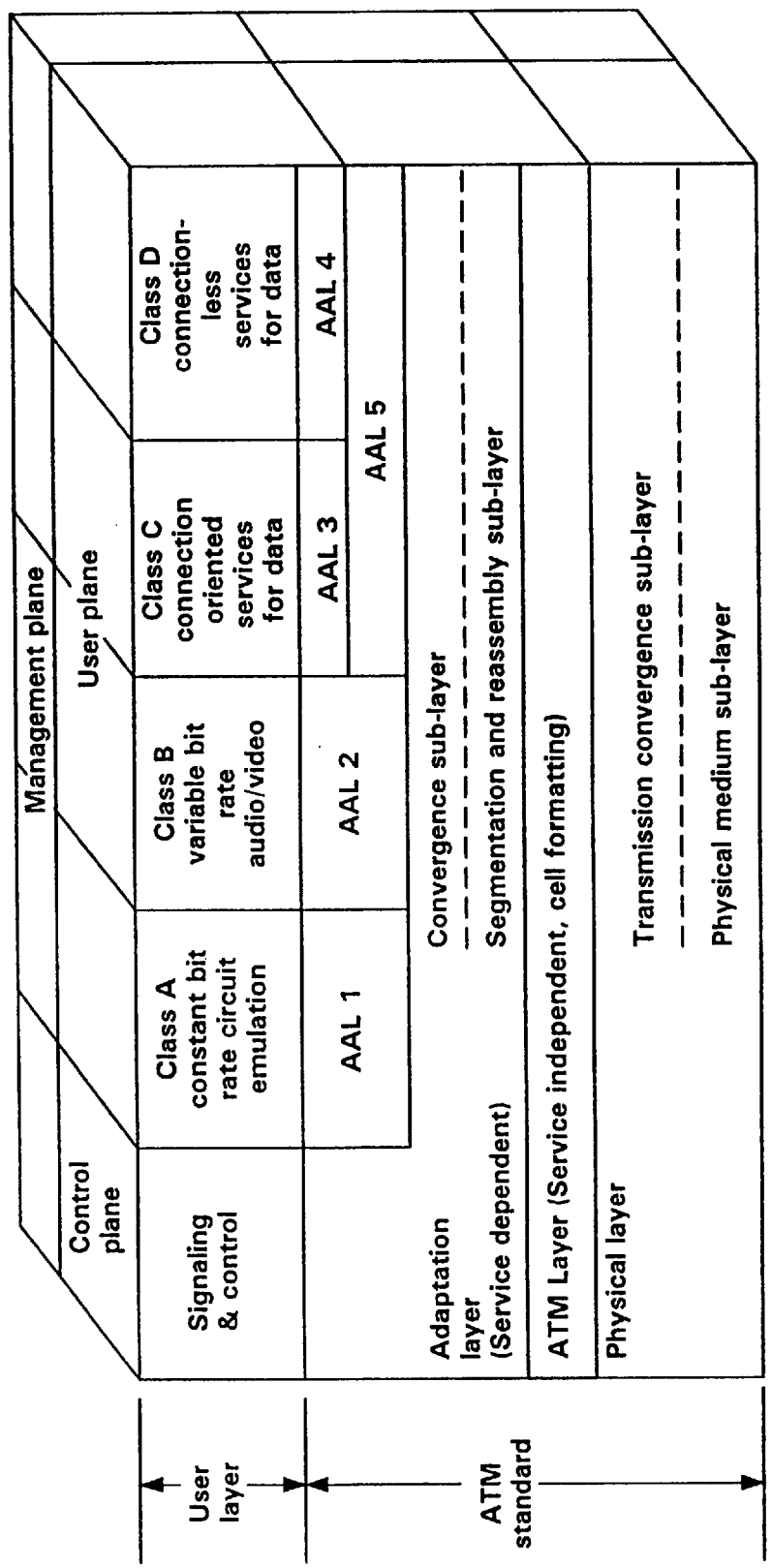
FIG. 5 is a diagram illustrating the CCITT B-ISDN reference model showing the varieties of service classes supported by the standard and the layers of the standard.

An ATM adaptation layer (AAL) is used at the "edge" of the network to enhance the services provided. As shown in FIG. 5, the CCITT reference model for B-ISDN services envisages that the AAL include service dependent functions. As depicted in FIG. 5, there are three layers in the ATM standard. The first layer is the physical layer defining the physical interfaces and framing protocols. The second ATM layer is independent of the physical medium chosen and defines cell structure, provides multiplexing and demultiplexing and VPI/VCI translation to control the flow of cells within the logical network. The third layer is the AAL which provides the important adaptation between the service and the ATM layer thereby allowing service-independent ATM transport. The AAL performs mapping between the original service format and the information field of an ATM cell. Exemplary functions provided by the AAL include variable-length packet delineation, sequence numbering, clock recovery and performance monitoring.

Deployment of ATM in Telecommunications Networks

One use of ATM technology can be within customer premises to support high-speed data communications in and between customer local area networks. In addition, ATM can be used as an infrastructural resource that is common to all services within a customer premises network, including voice and video communications, data transfers and multimedia applications.

An exemplary service for which ATM nodes are introduced into a public telecommunications network is to provide virtual leased line (VLL) service. VLL service is based upon a virtual path concept and allows line capacity to be directly tailored to customer needs and easily changed without modifying the interface structure. A large number of logical connections can be offered to a user through user-network interfaces (UNIs).

In addition, a custom tailored quality of service can also be offered to a customer, matching the needs of the user. Thus, multiple classes of service, quality of service classes and performance parameters can be selected. For example, voice services require low transmission delays but can tolerate high bit-errors, while data communications, on the other hand, are more tolerant of network delays but are sensitive to bit-errors. Thus, the quality of service level of a particular application can be contractually agreed to between a service provider and a customer and audited manually or automatically to ensure compliance.

Figure 6:
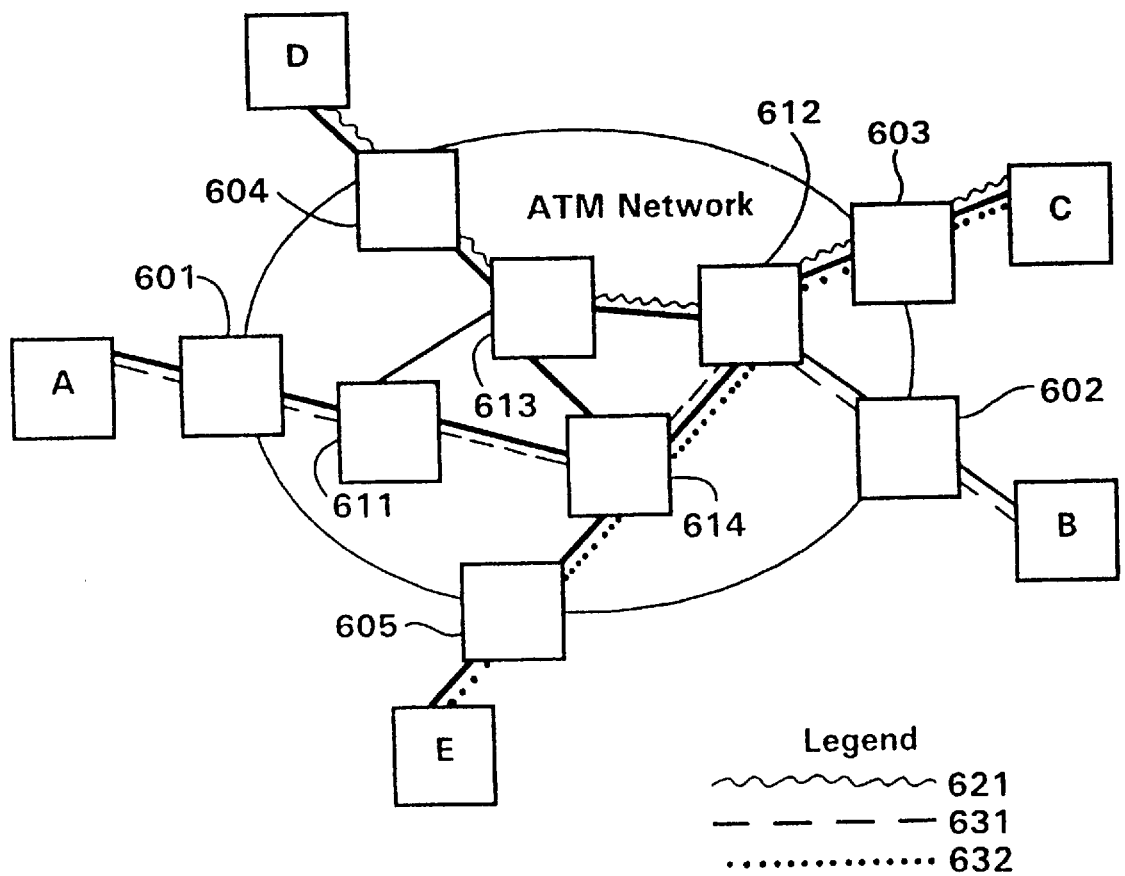
FIG. 6 is a diagram showing an illustrative ATM network providing Virtual Leased Line (VLL) service.

FIG. 6 shows an exemplary virtual channel based VLL service implemented within a ATM network. Network terminals A to E are each coupled through flow enforcement nodes 601 to 605, respectively, to ATM cross-connect nodes 611 to 614. The ATM network consist of a plurality of ATM cross-connects 611 to 614 which can provide routing both at the virtual path as well as at the virtual channel level. The flow enforcement functions 601 to 605 are located at the edge of the ATM network to protect the network against potential overloads. This function ensures that no connection violates the conditions that were agreed-to when the connections are setup.

Additional services can be implemented by adding services to one or more of the cross-connect nodes 611 to 614. Within the network of FIG. 6, an exemplary virtual path is illustrated by the wavy line 621 between terminal C and D. A first virtual connection between terminals A and B is illustrated by the dashed line 631 while a second virtual connection is illustrated by the dotted line 632 between terminals C and E.

In addition to the virtual leased line network shown in FIG. 6, other services, such as SMDS/CBDS and frame relay, can easily be added depending upon demand by connecting servers to the ATM nodes within the network. In residential areas, ATM technology can be used to provide new and enhanced entertainment services such as on-demand video to the end user. The flexibility of an ATM network makes it possible to simultaneously support a multitude of services, such as long distance education, home shopping, and games.

Figure 7:
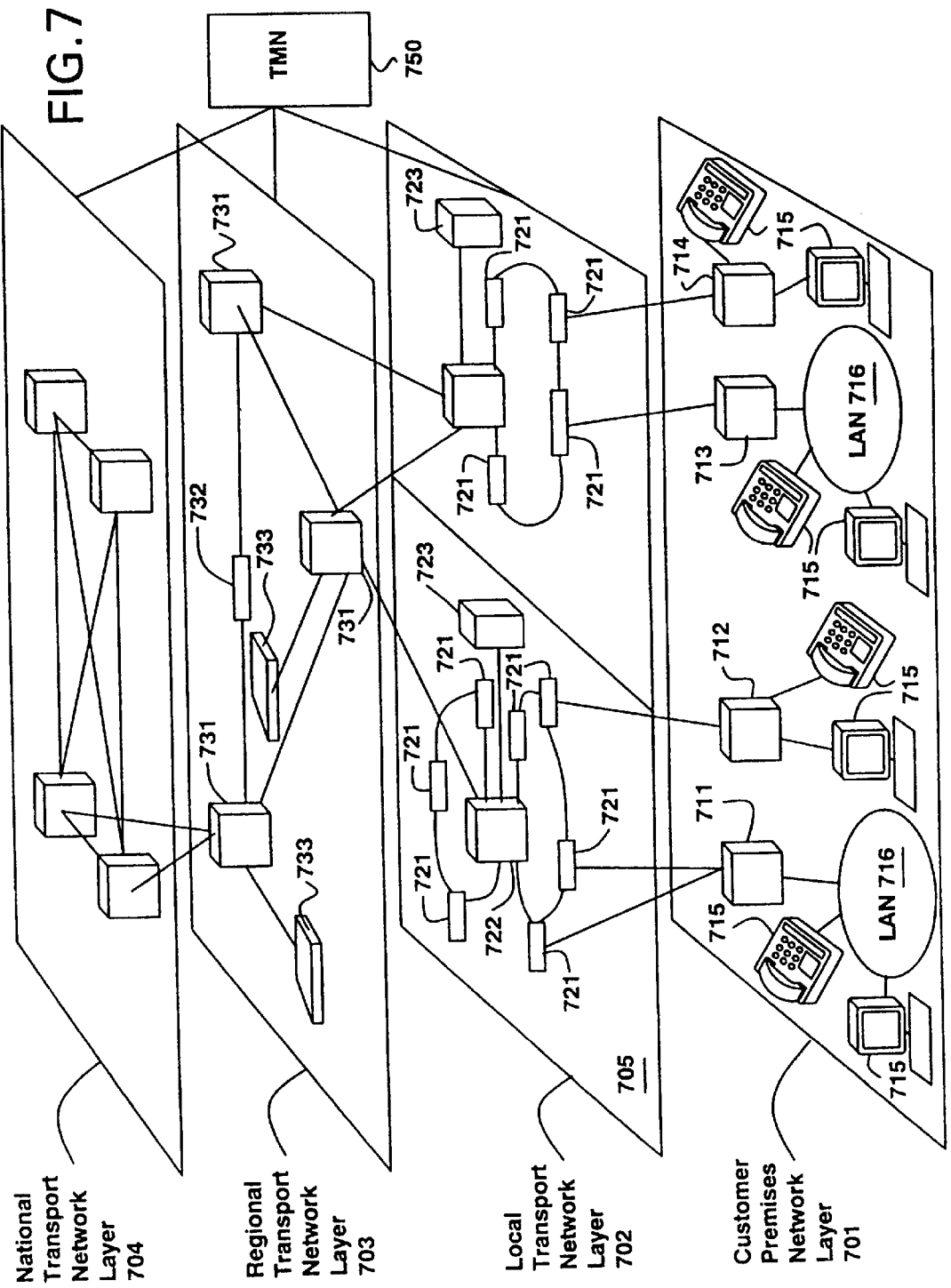
FIG. 7 is a diagram illustrating a multi-layered SDH-based transport network which includes ATM cross-connects.

FIG. 7 illustrates an ATM network that has been overlaid upon a SDH-based layered transport network. The layers include a customer premises network layer 701, a local transport network layer 702, a regional transport network layer 703 and a national transport network layer 704. A plurality of ATM business network nodes 711 to 714 control the flow of data from the customer premises terminals 715 and LANs 716 into respective ones of a plurality of add-drop multiplexers (ADM) 721 serving SDH cross-connect nodes 722 within the local transport network 705. The local cross-connect nodes 722 are in turn coupled through regional cross-connect nodes 731 in the regional transport network, two of which are coupled by add-drop multiplexers 732. Within the local transport network layer 702, a pair of ATM access nodes 723, and SDH rings, comprising the add-drop multiplexers 721, serve the cross-connects 722 and are used for subscriber access with a capacity of up to a full 155 megabits per second, the standardized STM-1 access rate for B-ISDN services.

Existing traffic such as the Plain Old Telephone Service (POTS) can also be carried on this ring network, with remote multiplexers and other access nodes providing the final local-loop connection. The ATM access nodes 723 are shared for access to different services from one location and can include both voice and data using different VP/VCs. In the ATM access nodes 723, ATM traffic is concentrated to make more efficient use of the transport capacity.

The size of an ATM access node can vary, depending upon the capacity required, from a small multiplexer to a large cross-connect. In the regional transport layer 703, ATM cross-connects 733 are used to route traffic between local areas. The use of ATM technology is not visible in the national transport network layer 704, illustrated in FIG. 7. In an ATM overlay network, such as the one illustrated in FIG. 7, services such as frame relay and SMDS/CBDS can be easily added. Functionality for B-ISDN can also be added to both access and regional nodes by adding appropriate software and hardware. As also illustrated in FIG. 7, a network management system 750, such as one operating in accordance with the TMN standard of the CCITT can be implemented to provide the necessary network management functionality to both the SDH and ATM elements of the network.

The management of the ATM network by subsystem 750 may be implemented in accordance with the telecommunications management and operations support (TMOS) family of network management systems provided by Telefonaktiebolaget LM Ericsson, the assignee of the present application. Such network management may include various functionalities such as routing algorithms and congestion control.

Organization of Connection Information in an ATM Exchange

As detailed earlier, the header segment of an ATM cell includes an 8- or 12-bit Virtual Path Identifier (VPI) and a 16-bit Virtual Channel Identifier (VCI). The VPI and the VCI represent the global address of each ATM cell and are encapsulated within the ATM cell (i.e., they travel with the cell). In one embodiment of the invention detailed in an earlier-filed U.S. patent application Ser. No. 08/593,497, the VPI and VCI information encapsulated in the incoming ATM cell stream through or to an ATM exchange is organized inside the exchange into a connection table consisting of 41-bit records.

Figure 8:
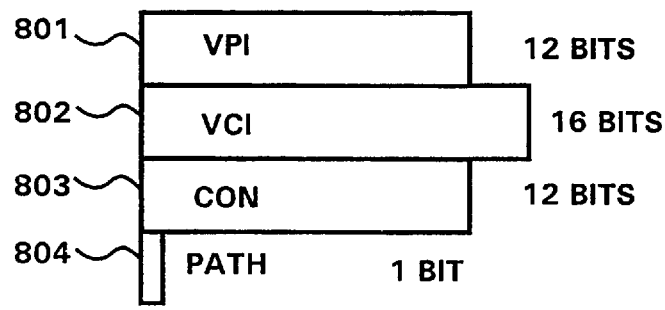
FIG. 8 is a block diagram showing the structure of a data record in one embodiment of a related invention.

The organization of the 41-bit data records within such a connection table is shown schematically in FIG. 8. Since the memory of most computing devices is organized in groups of eight bits (an "octet"), 41-bit data records are physically stored as 48-bit (i.e., a 6-octet) records.

As can be seen from FIG. 8, each record in the connection table described in the earlier-filed U.S. patent application Ser. No. 08/593,497, comprises a 12-bit VPI field 801, a 16-bit VCI field 802, a 12-bit CON field 803 and a 1-bit PATH field 804. TABLE 2 shows a description of this data record structure using the syntax of the C programming language.

TABLE 2

```
struct Connection {
    interrogatory VPI;
    interrogatory VCI;
    interrogatory CON;
    interrogatory PATH; /*   The VCI field is
                            validated when the PATH field is low
                         */
};
```

© 1995 Telefonaktiebolaget L M Ericsson (publ)

As noted above, the VPI field 801 and the VCI field 802 contain the VPI and VCI attributes of arriving ATM cells. The 12-bit CON field 803 contains a simplified address (that is local to an ATM exchange switch) that corresponds to the global address represented by the VPI field 801 and/or the VCI field 802. This simplified address is referred to as the Connection Number.

There are two types of connections in an ATM System: Virtual Path Connections (VPCs) and Virtual Channel Connections (VCCs). VPCs consist of one or more VCCs. VCCs have globally unique VPI and VCI values. Virtual Channels associated with a unique VPC have a common VPI value, and are distinguishable only by their VCI values. Each connection, whether a VPC or a VCC, has a unique Connection Number (i.e., a unique CON value) within an ATM exchange.

The 41-bit records of the connection table described in the earlier-filed U.S. patent application Ser. No. 08/593,497, are sorted according to the binary value of the VPI and VCI fields 801 and 802 respectively, with the VPI field 801 being treated as the more significant. The PATH field 804 is used to indicate whenever multiple virtual channels (VCs) are part of a single virtual path connection (VPC).

Whenever the 1-bit PATH field contains the binary value 0 (i.e., the PATH flag is "cleared"), the associated VPI value is required to be unique within the connection table. If the PATH field 804 contains the binary value 1 (i.e., the PATH flag is "asserted"), then the connection table may contain multiple entries having the same VPI value as long as each such entry has a unique VCI value relative to the other VCs that are part of the VP in question. Using the terminology defined earlier, a PATH value of 0 corresponds to a VCC while a PATH value of 1 corresponds to a VPC.

The connection table is sorted in numerical order. This facilitates the implementation of hardware checks to prevent the addition of illegal entries into the database. Upon startup, all data records are initialized with the hexadecimal values FFF and FFFF in their VPI field 801 and VCI field 802, respectively. Likewise, whenever a record entry is eliminated from the connection table, the VPI and VCI values of that data record are overwritten with these default values after reorganizing the database using the technique described in the earlier-filed U.S. patent application Ser. No. 08/593,497.

As described in the earlier-filed U.S. patent application Ser. No. 08/593,497, there are three principal operations that use the connection table in an ATM exchange: determining the Connection Number of an incoming ATM cell given its VPI and VCI values; taking down an active VPC or VCC; and setting up a new VPC or VCC. These three operations are referred to as the Data Look-up, the Data Removal and the Data Entry processes respectively. It should be emphasized that the Data Look-up algorithm is used as the first step in all three of these principal operations. The algorithms used for executing each of the three processes are reviewed in greater detail below.

The Data Look-up Algorithm

As described in the earlier-filed U.S. patent application, Ser. No. 08/593,497, look-up requests to the connection table in an ATM exchange are executed using a modified binary search algorithm that uses the VPI field 801 (and optional the VCI field 802) as the search key(s) to retrieve the corresponding connection information from the Connection Number (CON) field 803.

The operation of a binary search algorithm can be briefly explained as follows: in a sorted database of $2^m$ words, one begins the search by looking first at the word at position $2^{m-1}$. If w, the word one is looking for, matches d, the current retrieved value from the sorted database, the search terminates. If, however, w, the word one is looking for, is smaller than d, the retrieved value, then the search is continued at the location $2^{m-1}-2^{m-2}$. On the other hand, if d is larger than w, then the search is continued at the location $2^{m-1}+2^{m-2}$. This process is iteratively repeated until the address increment becomes less than one, when the search is terminated. The wanted record, w, is assumed to be absent from the database if it is not found within m attempts.

Figure 9:
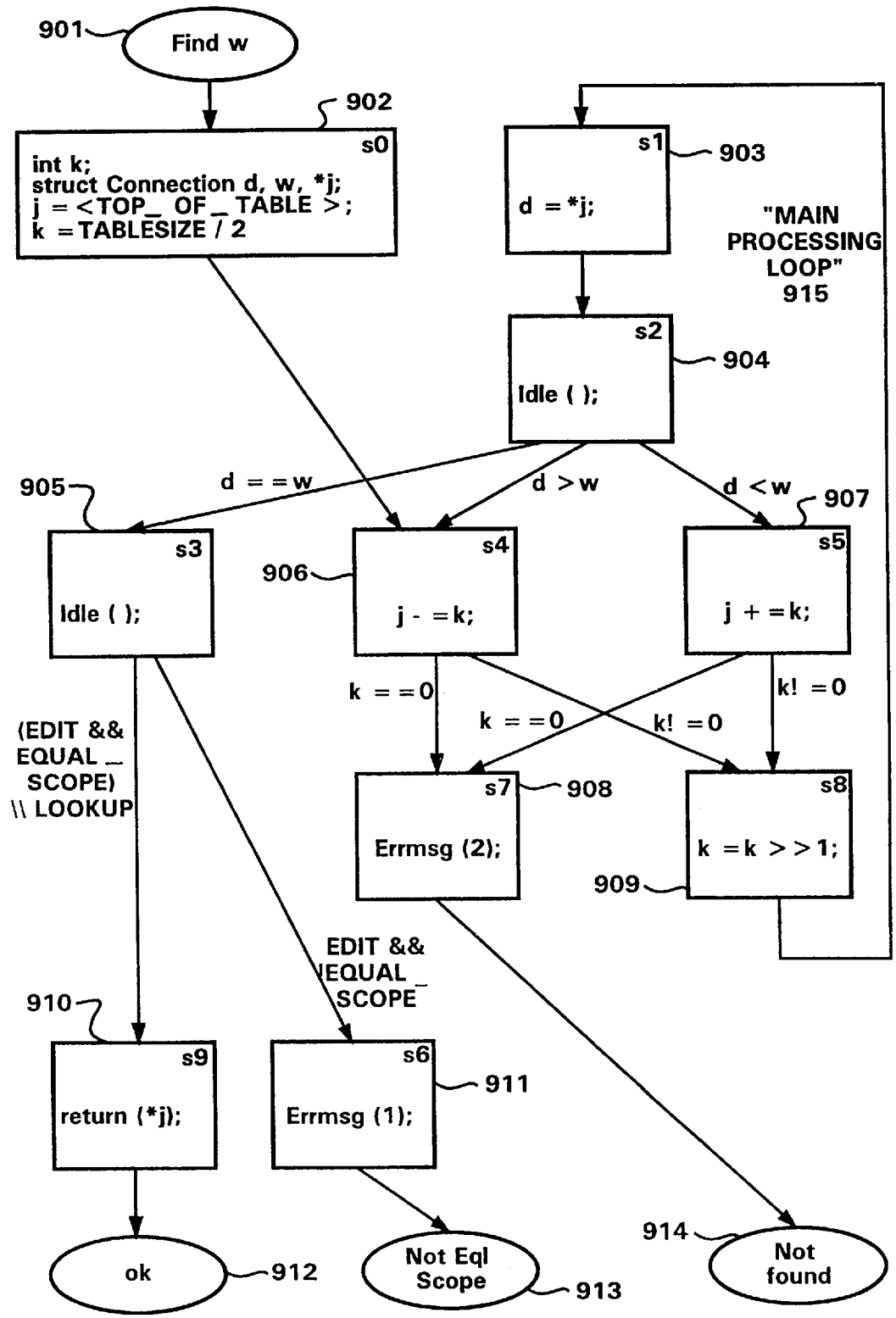
FIG. 9 shows the state machine for the modified binary search algorithm used for executing look-up requests in a related invention.

FIG. 9 shows the state machine for the modified binary search algorithm used for executing look-up requests, as described in the earlier-filed U.S. patent application Ser. No. 08/593,497. In FIG. 9, j is a variable that points to a data record in the database. The integer variable k represents address increments or decrements at each stage of the search process and is local to the binary search process. In contrast, the variable j is quasi-global variable that may be manipulated by other computing routines inside the ATM exchange processor other than the binary search process. The input variable, w, and the retrieved data record, d, are both structured data types ("structs") of the type Connection, as shown in TABLE 2.

The comparison of d and w is performed using both the VPI and the VCI fields of d and w or using only the VPI fields of d and w depending on the PATH values of d and w. During a Data Look-up operation, if the PATH flag of either d or w is asserted, then the comparison of d and w is done on the basis of their VPI fields alone. On the other hand, if the PATH flags of both d and w are cleared, then the comparison of d and w is done on the basis of both their VPI and VCI fields, with the VPI being considered as more significant.

Whenever the Data Look-up process is used to determine the Connection Number (CON) value of an arriving ATM cell "on the fly", only the VPI and VCI values of w will be available. Since the PATH value corresponding to w is not available in such cases, it is set to zero for purposes of executing the Data Look-up process.

When the Data Look-up process is used to take down (i.e., disconnect) a VP or a VC connection, the record entry corresponding to this connection needs to be located and removed from the connection table. In such a case the w value contains the data item to be located in the database and the PATH flag of w (which is received from an upstream system) indicates whether the connection to be taken down is a VP connection (i.e., its PATH value is 1) or a VC connection (i.e., its PATH value is 0). When the PATH flag of w is set to 1, it indicates that the VCI value of w is not important.

The binary search algorithm can also be used to "investigate" an entry. In such a case too, the value of the PATH flag for the input variable w becomes meaningful. Further discussion of this situation is to be found later in this specification. Investigating entries involves many of the same actions as on-the-fly (OTF) look-up. Investigation of entries is sometimes used for verifying the consistency of data entries at the time of initial entry. It is also used for maintaining the consistency of data. It should be noted that requests for investigation of entries are often accorded lower execution priority than other processes competing for processor cycles, and may sometimes be (temporarily) suspended.

As shown in FIG. 9, the search process starts at 901 when a look-up request to find a data record corresponding to an input variable w is received. At 902, the pointer j is initially set to point to the top of the table and the address increment variable k is initially set to half the size of the table. The search proceeds at 906 with the retrieval of the search record at the location corresponding to the value of j as decremented by k. If the increment value k is found to be zero, an error message is generated at 908 and the search terminates at 914. If the value of k is found not equal to zero, then the search proceeds to 909. If the value of k is found greater than one, then the Main Processing Loop 915 of the binary search process is entered and the search jumps to 903 whereby a data record corresponding to the pointer value j is retrieved from memory.

The current value of d is then compared with the input variable w at 904. If d is found equal to w, the process jumps to 905. If d is found greater than w the process jumps to 906. If d is found less than w the process jumps instead to 907.

If d is found less than w at 904, then the pointer j is incremented by current value of the local address increment variable k at 907. If the value of the address increment variable k is not equal to zero, then the search proceeds to 909 and continues as described earlier. However, if the address increment variable k is found equal to zero at 907, then an error message is generated at 908 and the search terminates at 914 as described earlier.

If the data structure variables d and w are found to match at 904, and if the search request is an edit request, then the scope of the variables d and w is compared at 905 on the basis of the PATH flags of d and w. If the search request is an edit request and variables d and w are equal in scope (i.e., their PATH flags are the same), then the binary search process returns the value of the pointer j at 910 and terminates at 912.

Alternatively, if the search request were a Data Look-up request on an incoming ATM cell and, if d and w are found to match, then the look-up request terminates successfully and the value of CON, the Connection Number, is returned. If on the other hand the search request is an edit request and the PATH flags of d and w do not match (i.e., d and w are not equal in scope), then an error message is generated at 911 and the process is terminated at 913.

It should be emphasized that if the PATH fields 804 of either d or w are found equal to one, then the comparison of d and w is performed using only their VPI fields 801. Whenever a connection needs to be taken down, then the PATH values of d and w need to be equal in scope. The verification of the equality of scope of d and w using the PATH flag ensures that a command to disconnect a VC connection does not result in the removal of a VP connection and vice versa. The return value of the look-up process is *j (i.e., a pointer to the location of the matching record).

In order for the binary search to work properly, all database records that do not contain data entries corresponding to currently active connections also need to be in sorted order. In the embodiment disclosed in the earlier-field U.S. patent application Ser. No. 08/593,493, this is achieved by initializing the entire memory to the binary value "1" and by resetting abandoned or disused connection entries with the binary value "1" after bubbling them to the top of the memory. This is equivalent to initializing all VPI fields 801 to the hexadecimal value FFF and all VCI fields 802 to the hexadecimal value FFFF.

In the preferred embodiment of the present invention disused entries in the connection database are flagged as "holes" and distributed within the database in such a manner as to minimize the amount of "bubbling" of new connection entries. Additional details about this technique can be found later in this specification.

The Data Entry Process

Figure 10:
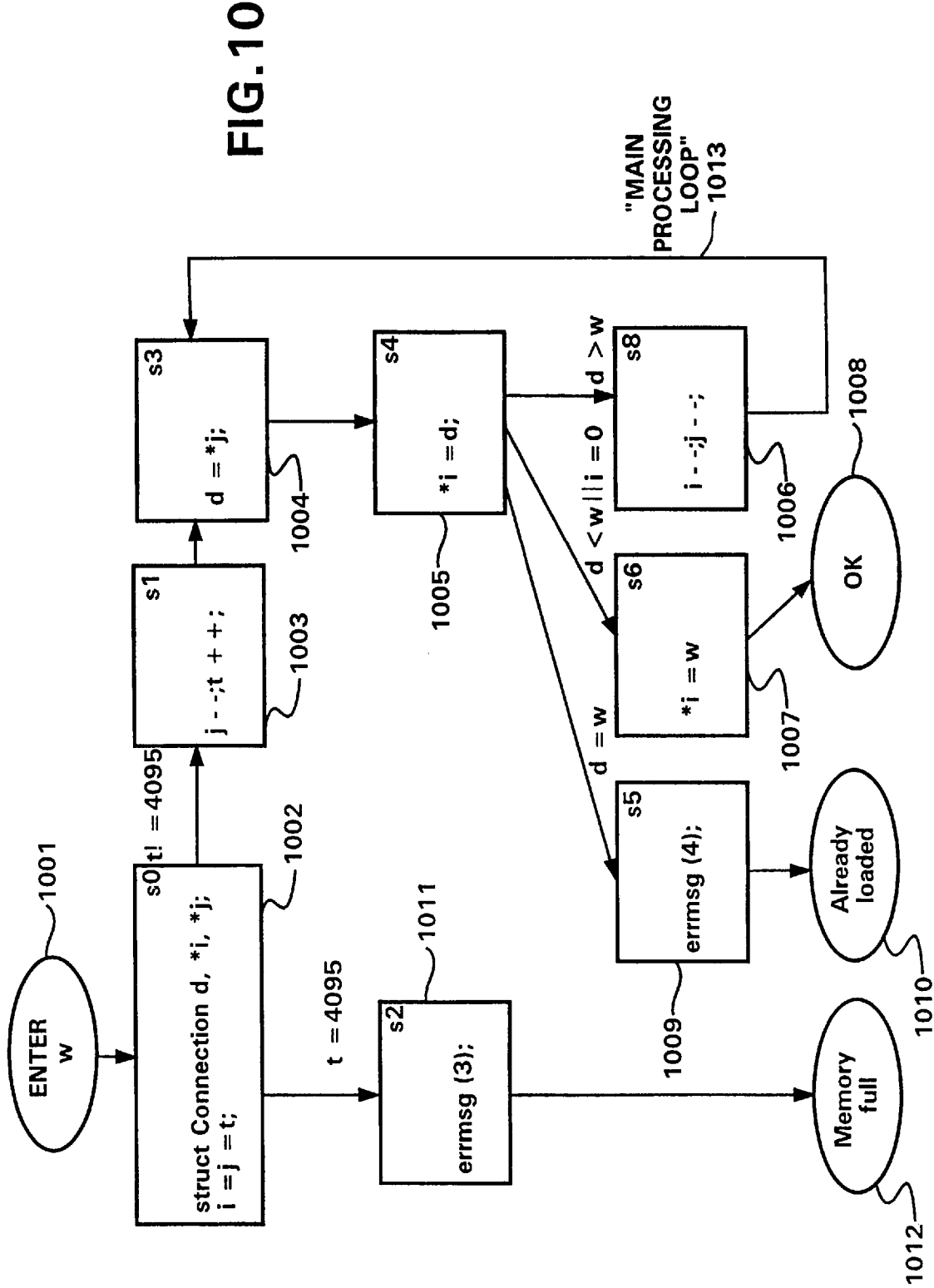
FIG. 10 shows the state machine for the modified bubble-sort algorithm used for executing data entry requests in a related invention.

FIG. 10 shows the state machine for the modified bubblesort process used for executing data entry requests, as described in the earlier-filed U.S. patent application Ser. No. 08/593,497. In a conventional bubblesort algorithm, a data entry can be added anywhere in the database before being "bubbled" up to the correct location. However, in any database (such as a connection table in an ATM exchange) that is so organized as to be searched using a binary search algorithm, a new entry cannot be entered into a database until its final position within the database has been determined and room has been created for its entry.

Further, the Data Entry process in an ATM exchange is continually subject to preemption by the Data Look-up process. Thus one needs a dummy "placeholder" for a new entry that does not impact on the sorted order of the database while the place holder is being bubbled to its final position within the database. This feature is essential since the Data Entry process may be preempted at any time by a Data Look-up request. If the Data Look-up process is to run properly, then the database constantly needs to be in sorted order. Since the Data Entry process may be preempted by a Data Look-up process, the local parameters of the data entry algorithm need to be preserved whenever such an interruption occurs until the interrupted process is resumed.

In the bubblesort Data Entry process illustrated in FIG. 10, i, j, and t are pointers to structured records ("structs" or "records") of the type Connection. The Data Entry process starts at 1001 when a request to add an entry is received. i and j are local variables of the data entry process that are initialized upon the invocation of the Data Entry process to point to the same record as t as shown at 1002. t is a quasi-global variable which points to the first unused location in memory that may be modified by processes other than the Data Entry process. The variable t initially points to an offset of zero from the start of the table.

Upon successful termination, the Data Entry process either enters the new record into the connection table, or in the case of an error, returns a pointer to the location in memory containing an erroneously duplicated data record (that needs to be discarded). It should be noted that in the embodiment of the connection table of an ATM exchange as described in the earlier-filed U.S. patent application Ser. No. 08/593,497, allocates 12 bits of each 41-bit data record to the Connection Number (CON) field 803, the maximum size of the database is $2^{12}$ (i.e., 4096) records numbered 0, 1, 2 . . . 4095.

At 1003, the pointer j is decremented by one and the pointer t is incremented by one. At 1004, a data entry corresponding to the pointer value j is retrieved from memory and stored in d. At 1005, this value stored in d is first written to address i. Then the d-value stored in the database at the address i is compared with the input variable w. If d is found greater than w, the pointers i and j are decremented by one at 1006 and the process jumps back to 1004 following the Main Processing Loop 1013.

If d is found less than w or if the pointer i is found equal to zero, then the input variable w is written to address i at 1007 and the process ends at 1008. If the values of d and w are found to match at 1005, an error message is generated at 1009 and the invoking process is informed at 1010 that the input variable is already loaded in memory.

If the value of t reaches 4095, then an error message is generated at 1011 that informs the invoking process at 1012 that the memory is full and that no more connections can be established in the database unless and until some existing connections are released or discarded. This is because the Connection Number (CON) field 803 is 12-bits wide in one embodiment of the invention described in the earlier-filed U.S. patent application Ser. No. 08/593,497 and thus, the database can have no more than 4096 entries. In general, an error condition is triggered at 1011 if the value of t sets a preset maximum value that is related to the size of the connection table.

An Illustrative Example of the Data Entry Process

FIG. 11 illustrates the stages in the data entry sequence for an exemplary database containing six data records, as described in the earlier-filed U.S. patent application Ser. No. 08/593,497. Since the database contains six data entries, the value of the variable t is six just prior to the entry of the seventh data record. Assume that the seventh data item w, having VPI, VCI and PATH values of 5COh, 001h and 0h respectively, is to be added to the database. Since the PATH value of the new data item w is zero, this new connection is a VCC.

The algorithm first enters the state s0 wherein the pointers i and j are set equal to t as shown at 1002. FIG. 11A shows the organization of the database after the algorithm goes through the states s0, s1, s3 and s4, i.e., after the pointer j has been decremented at 1003, the pointer t has been incremented at 1003, and the contents of database record 5 have been read at 1004 and copied to address location 6 at 1005.

FIG. 11B shows the organization of the database following state s4 after one full round of the Main Processing Loop 1013 of FIG. 10. As shown in FIG. 10, a plain copy of the data record is made while preserving the sorted order of the database. The Data Entry process continues along the Main Processing Loop 1013 until i points to zero or until both i and j point to data items that are smaller than w. The comparison of d and w is done after the Data Entry process enters state s4, i.e., at 1005 of FIG. 10.

The comparison of d and w is performed based on the contents of the PATH flag as described earlier. If the data entry d is found to be smaller than w, the Data Entry process enters the state s6 as shown at 1007 of FIG. 10. The organization of the database now looks as shown in FIG. 11C. The state machine now enters the new item w into the database at address i overwriting the bubbled-up duplicated entry at that position. The organization of database at the end of the Data Entry process is shown in FIG. 11D.

One of the principal advantages of this data entry technique is that the Data Entry process is interruptible and permits a successful binary search for any of the items in the database during such an interruption. The number of cycles that the algorithm state machine spends in the Main Processing Loop 1013 of FIG. 10 is dependent on the final location of the data item and upon how full the database is initially.

On the average, it will take 1.5t+4 cycles to determine the final location of a new data item. If all machine cycles are assumed to be equally long and further assumed to be dependent upon the access time of commercially-available semiconductor memory (e.g., 50 nanoseconds (ns)) then for an initial database of 4000 entries, the mean entry access time can be computed as 50*(1.5*4000+4) ns, i.e., 300 microseconds ($\mu$s).

This figure can be improved upon by using faster memory. However it should be noted that in practice the access time is likely to be slower than the figure of 300 $\mu$s computed above if the data entry process is interrupted by other processes having higher priority. It should be noted that the Data Removal process places a similar computational load on the processor as the Data Entry process and is likely to be, on the average, as active as the Data Entry process.

The Data Removal Process

Figure 12:
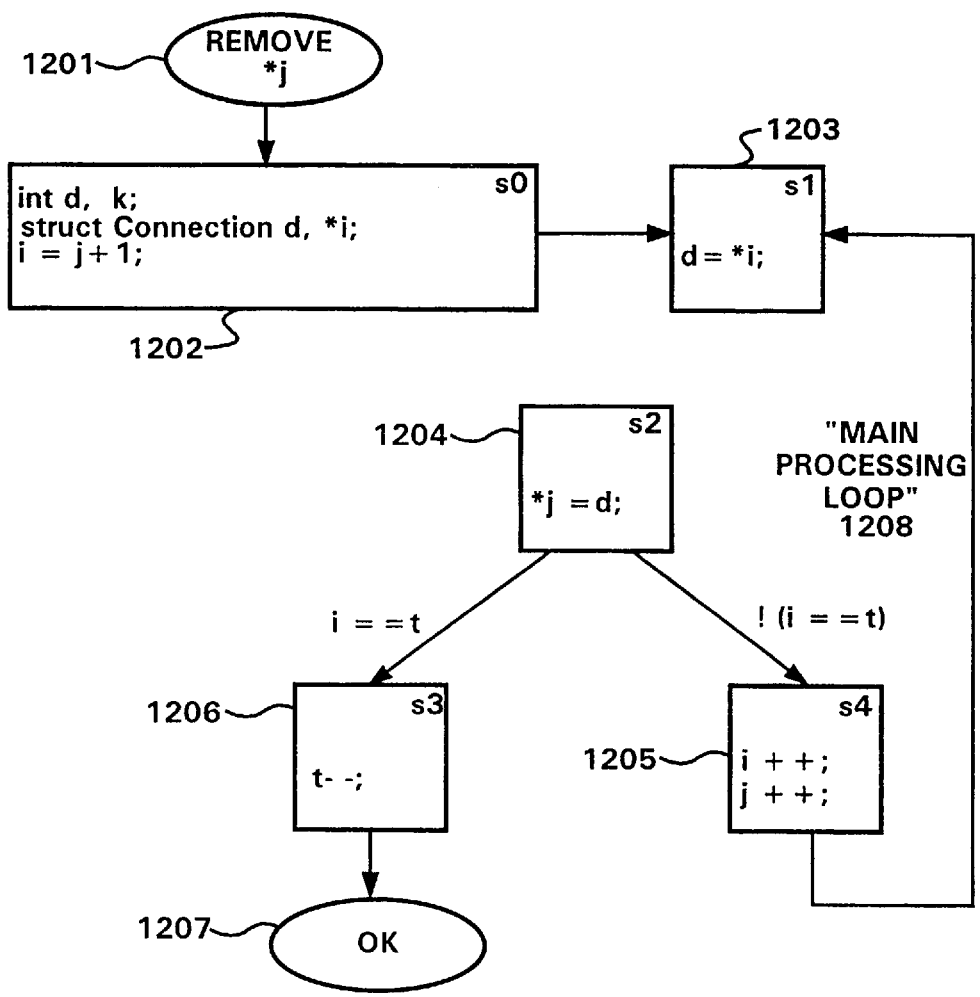
FIG. 12 shows the state machine for the modified bubble-sort algorithm used for executing data removal requests in a related invention.

FIG. 12 shows the state machine for the modified bubble-sort process used for executing data removal requests as described in the earlier-filed U.S. patent application Ser. No. 08/593,497. Like the Data Entry process, the Data Removal process is also a variant of the bubblesort technique wherein data entries that are to be discarded are successively overwritten until the process reaches the top of the available memory.

The process starts as shown at 1201 in FIG. 12 with a request to remove an entry corresponding to a pointer value j. i, j, and t are pointers to structured data records ("structs") of the type Connection. i and j are variables local to the data removal process while the variable t is quasi-global. The variable t can be modified by other processes such as the Data Entry and the Initialization processes. The variable t points to the lowest unused location in memory and initially points to an offset of zero from the start of the table.

The variable d is the register that is used to temporarily store data records. The data record to be removed is first identified using the Data Look-up process or by the failure of a Data Entry process, both of which yield the pointer *j This pointer *j is used as the input to the Data Removal process state machine as shown at 1201. At 1202, an auxiliary variable i is initialized with the value j+1 and the data record at location *i is copied to the location *j as shown at 1203 and 1204 using the register d as intermediate storage. If the top of the table has not been reached, the process enters state s4 wherein the variables i and j are both incremented by one, as shown at 1205.

The process continues along the Main Processing Loop 1208 shown in FIG. 12 to state s1 and repeats steps 1203 and 1204 until the pointer i points to the top of the in-use section of the table. When i is found equal to t, the process enters state s3, and results in the value of t being decremented by one at 1206. The Data Removal process signals successful completion of the process by issuing a confirmation to the invoking process at 1207. The requirement that the database always remain in a sorted order is satisfied by the bubblesort Data Removal process illustrated in FIG. 12.

Interleaved Operation of Look-up, Entry and Removal Process

The input to the Data Removal process is a pointer to the data entry that needs to be removed. In order to obtain this starting value, another process such as the (binary search-based) Data Look-up process needs to be executed first on the connection table.

The Data Removal process may also be initiated by the failure of the Data Entry process. This can happen as shown in FIG. 10 if the Data Entry process state machine reaches state so in step 1009 and exits with an error message at 1010. If the data entry algorithm exits through state so, the database needs to be reorganized since the pointers i and j point to two adjacent duplicate entries in the database at the moment of exit. Consequently, all valid data at higher locations in memory have been shifted up by one position. It should be emphasized that this situation does not affect the efficiency of the Data Look-up process as it only results in an address location being used up unnecessarily.

If the Data Entry process reaches the state so, then the Data Removal process needs to be executed in order to restore the database to the state it was in prior to the failed attempt to add a new data entry. In such a case the output *j of the Data Entry process is fed back as an input to the Data Removal process. Since such failed attempts to add data entries waste processing time, it would be best if they could be completely avoided. This can be ensured by performing a search before the start of the data entry process or by having the software verify data prior to any attempted entry.

Investigation of the correctness of data to be entered is thus useful to the efficient operation of a connection table in an ATM exchange. Safeguarding against the corruption of database entries can be done either in hardware or in software. In one embodiment of the invention, disclosed in the earlier-filed U.S. patent application Ser. No. 08/593,497, it has been assumed that very few of the connections that are sought to be entered will fail, hence making software checking at entry time sufficient. However this design choice requires a memory restoration process whenever an error occurs. The need for this cumbersome correction process can be avoided by implementing stricter checks on the entry of data records.

The Data Element "Hole" Concept

The database management techniques of the present invention are based upon the binary-search and the bubble-sort techniques, but with some essential and significant modifications. The system and method of the present invention introduces "holes" in the table of connection records, i.e., empty memory-locations that are interspersed amongst the occupied memory-locations. These "holes" can make the insertion and deletion of connection records into or from the connection table far more efficient than would have been possible with the traditional bubblesort technique, the insertion sort technique or the modified bubblesort technique detailed in the earlier patent application Ser. No. 08/593,497.

As used in this patent application, the term "bubblesort" refers to the family of sorting techniques wherein an item to be added to or deleted from a linear list is moved linearly from one end of the list to its final sorted position within the list or vice versa.

It should be noted that the term "bubblesort" has traditionally been used to describe a general sorting technique where an unordered list of n elements is sorted by scanning the list serially, two elements at a time, from one end to the other. If a comparison of the two elements reveals that the pair of elements are disordered (i.e., unsorted) relative to each other, then the two elements are exchanged. At the end of one such scan, the last element in the scan direction will be in its final sorted position. After n−1 successive scans over the unsorted portion of the list, this compare-and-flip approach (called "traditional bubblesort" herein) yields a fully sorted list.

Sometimes, one needs to insert a new element into a sorted table. The term insertion sort is used to refer to the insertion of a single item into an ordered set of elements. Insertion sort can be viewed as the last pass of a recursive bubblesort algorithm. In this process, we start at one end of the table (say, the bottom of the table and containing the largest element) and compare the bottom element with the new element. If the new element is larger than or equal to the bottom element, it is added on below the earlier bottom element, and the sort process is terminated.

If the new element is smaller than the earlier bottom element, the bottom element is moved down one position and the new element is written into the position just above it. The compare-and-flip process is next repeated for the two elements just above the bottom of the table. This iterative process is terminated when the new element is larger than the element above it. The insertion sort can also be performed starting at the top of the table (i.e., with the smallest element). The term "bubblesort" is used in the present application to refer to both the traditional bubblesort technique as well as to the insertion sort technique.

The use of holes has been found to result in an improvement in performance. Bubblesort is a very time consuming algorithm that is based on bubbling free table positions from the bottom of the table up to the desired insertion point. In the preferred embodiment of the present invention, this algorithm is enhanced by distributing dummy data records (i.e., free table positions) between active connection records (i.e., occupied positions) so that the "bubbling distance" is significantly reduced. Needless to say, such an enhanced bubblesort technique requires data records to be tagged so that "holes" can be distinguished from active connection records.

The performance improvements over existing algorithms derive from the implementation of such free table positions, or "holes" in the connection table. As used in the present invention, the term "holes" refer to empty or free data records in the Random Access Memory (RAM) or Content Addressable Memory (CAM) of the communications exchange that are distributed between groups of one or more connection records.

It has been found desirable for the holes to be relatively uniformly distributed in the table so that a new connection record can be written either directly over a hole data record, or after moving a hole by just a few positions to serve as a placeholder to receive a new connection data record. This means that instead of having to "bubble" up a dummy data record from the bottom of the table each time a new connection is set-up, it now becomes necessary to only "bubble" a hole a few positions, or no positions at all, to position it correctly for entering a new connection. This dramatically reduces the insertion time and disconnection time for data records. A new field in the table data records (called the "HOLE" flag) is used to indicate whether a specific record in the connection table is free or occupied.

Figure 13:
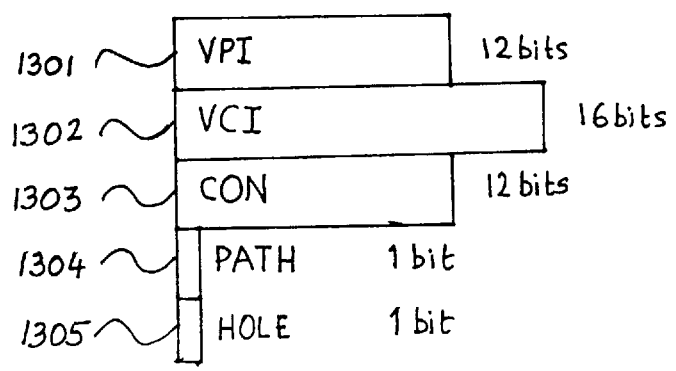
FIG. 13 is a block diagram showing the structure of a data record in one embodiment of the present invention.

FIG. 13 shows the structure of the records of the connection table of the present invention. As can be seen from FIG. 13, each record in the connection table comprises a 12-bit VPI field 1301, a 16-bit VCI field 1302, a 12-bit CON field 1303, a 1-bit PATH field 1304 and a 1-bit HOLE field 1305. TABLE 3 shows a description of this data record structure using the syntax of the C-programming language.

TABLE 3

```
struct Connection {
    interrogatory VPI;
    interrogatory VCI;
    interrogatory CON;
    interrogatory PATH; /*  The VCI field is
            validated when the PATH field is low
            */
```

TABLE 3-continued

```
    interrogatory HOLE; /*  A database record
            contains data relating to an active
            connection when the HOLE field is low
            */
};
```

© 1997 Telefonaktiebolaget L M Ericsson (publ)

As noted above, the VPI field 1301 and the VCI field 1302 contain the VPI and VCI attributes of arriving ATM cells. The 12-bit CON field 1303 contains a simplified address referred to as the Connection Number (that is local to an ATM exchange switch) corresponding to the global address represented by the 8-bit or 12-bit VPI field 1301 and/or the 16-bit VCI field 1302.

The PATH field 1304 is used to indicate whenever multiple virtual channels (VCs) are part of a single virtual PATH connection (VPC). As noted earlier, a PATH value of 0 corresponds to a Virtual Channel Connection (VCC) while a PATH value of 1 corresponds to a Virtual Path Connection (VPC). The 1-bit HOLE field 1305 is used to identify a data record in the connection table as representing either an active connection or a data record that has been recycled as a hole. Thus a HOLE value of 0 corresponds to an active record while a HOLE value of 1 corresponds to an inactive record (i.e., a "hole").

Hole Distribution

Background Process

To prevent clustering of connections in the date table, it has been found desirable to include a Hole Distribution Process, running as the lowest priority background process that operates only when all other processes are silent. The Hole Distribution algorithm is used to distribute holes in a relatively uniform manner over the entire data table. Consequently the Hole Distribution algorithm needs means to continually monitor the distribution of holes and keep them as optimal as possible.

The desired optimal distribution of holes further requires that the holes be moved in such a way that the table always remains fully sorted. This is necessary because the binary search-based Look-Up algorithm requires a sorted table in order to be able to find the right connections. Further, the Hole Distribution Process must be capable of robust operation even if it is interrupted by any other process. Whenever the Look-Up process or the Data Entry process is active, the Hole Distribution process remains silent.

The Hole Algorithm

A "hole" can be defined as an inactive record in the connection table. By introducing a new field called HOLE into the table record, it is possible to identify a table location as being either free or occupied. The HOLE bit needs to be a part of the search key used by the (binary search-based) Look-Up algorithm, because the algorithm needs possible to differentiate a hole record from an active connection record having the same VPI/VCI value. Multiple hole positions may have the same VPI/VCI values because of the operation of the Hole Distribution process that is described in a later section of this patent application.

If the search process searches for a connection record using only its VPI and/or VCI values, it may fail to locate the desired connection, especially if the HOLE bit is not a part of the search key. This is because the algorithm then cannot determine the direction in which to search if it comes across a hole data record.

The Look-Up Algorithm

The Look-Up algorithm used in the present invention (which is based on the binary-search technique) is in operation substantially identical to the search algorithm disclosed in the earlier-filed U.S. patent application Ser. No. 08/593,497 and depicted in FIG. 9. The operation of the Look-Up Algorithm is shown in the flow chart of FIG. 14.

The binary-search algorithm is invoked at 1401 and provided with the VPI, VCI and PATH values of the connection entry being investigated (the Search Object). At 1402 a number of initialization steps are performed. The FOUND flag is set to 0. The variable POS is initially set to one-half the size of the connection table, i.e., one-half of the maximum number of records that can be stored in the ATM connection information database. Thus, the variable POS initially points to the center of the table. The variable DIST is set to one-quarter of the maximum number of records in the connection table. The variable DIST represents the search increment for the binary-search algorithm.

At 1403, the connection entry at the position corresponding to the current value of the variable POS (called the "Retrieved Object") is retrieved into a test register Reg1. Next, at 1404, the Search Object (identified by its VPI, VCI and PATH values) is compared with the Retrieved Object (using the VPI, VCI and PATH values that were retrieved into the test register Reg1 in 1403).

If the Retrieved Object is determined to be equal to Search Object, then the value of the variable FOUND is set to 1 at 1405 to indicate that the Search Object already exists within the connection table and can be found there at position POS. The current values of the variables FOUND and POS are then returned to the invoking routine at 1406 and the process ends with a transition to the idle state 1407.

If the results of the comparison at 1404 reveals that the Retrieved Object is greater than the Search Object, the DIST variable (the jump increment for the binary-search) is next checked at 1411 to make sure that it has not become smaller than unity. As long as the DIST variable is found at 1411 to be greater than or equal to unity, the POS pointer is decremented by the current value of the DIST variable at 1412. The variable DIST is then reduced to half its previous value, as shown at 1408. The state machine then jumps back to step 1403 and continues from there as described earlier.

If the test at 1411 reveals that the DIST variable has become less than unity, it indicates that the binary search algorithm has reached its natural termination point. In this case the Look-Up process branches to 1406 where the current values of the variables FOUND and POS are returned to the invoking routine before the Look-Up process again transitions to the idle state 1407.

Alternatively, if the results of the comparison at 1404 reveals that the Retrieved Object is smaller than the Search Object, the DIST variable is checked at 1421 to make sure that it is not smaller than unity. If the DIST variable is found to be greater than or equal to unity, then the POS variable is incremented by the current value of the DIST variable at 1422. As before, the variable DIST is then reduced to half its previous value at 1408. Once again, the state machine next jumps to 1403 and continues from there as before.

If the test at 1421 reveals that the DIST variable is less than unity, it again indicates that the binary search algorithm has again reached a natural termination point. In this case the Look-Up process branches as before to 1406 where the current values of the variables FOUND and POS are returned to the invoking routine before the Look-Up process transitions, once again, to the idle state 1407.

Connection Set-up Using the Edit Algorithm

Figure 15:
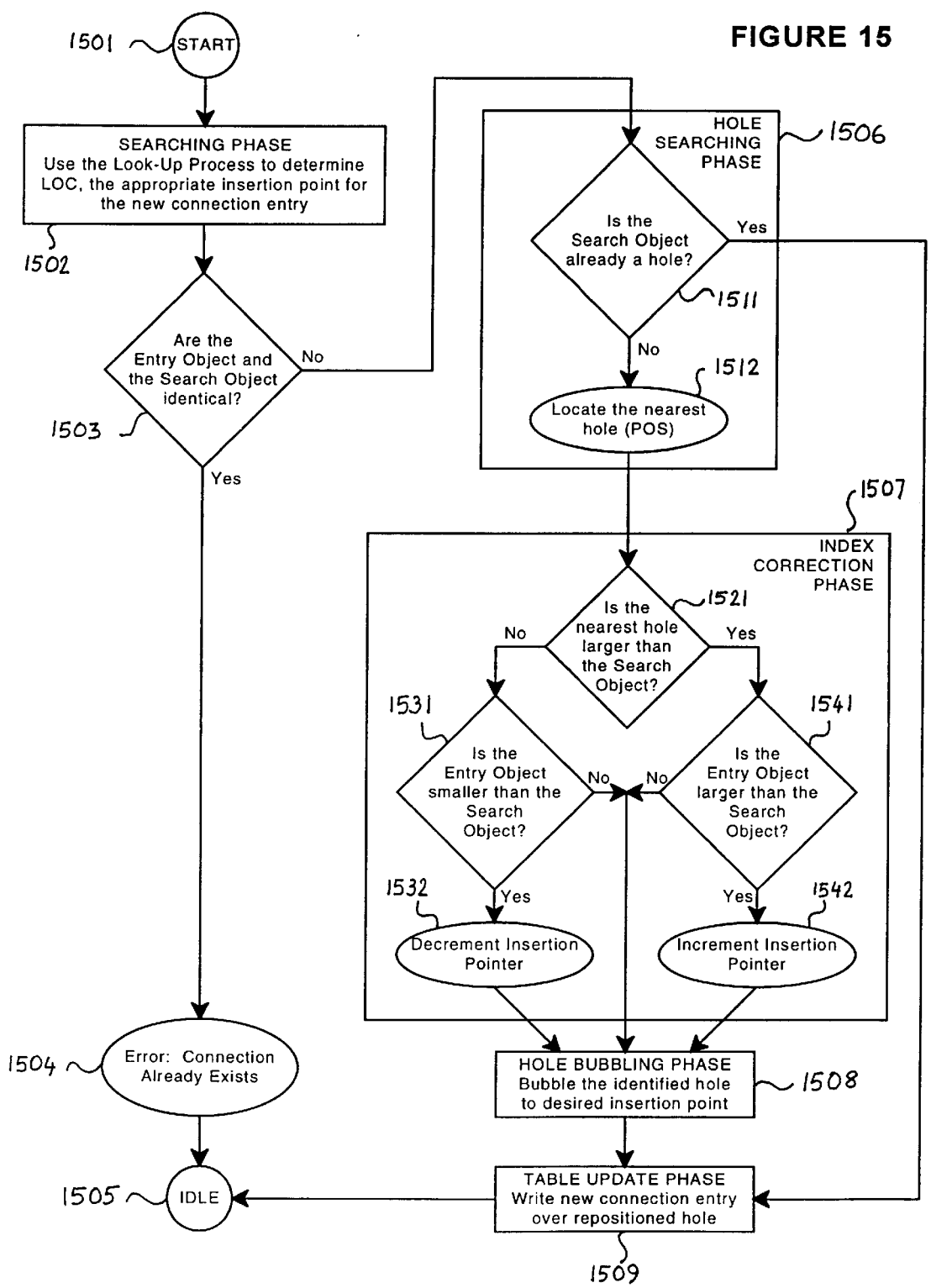
FIG. 15 is an overview flow chart showing the operation of the enhanced insertion algorithm of the present invention.

FIG. 15 is a flow chart providing an overview of the operation of the enhanced connection insertion algorithm (called the New_Connection algorithm). The process of adding a new connection starts at 1501 when the insertion algorithm is invoked and provided with the VPI, VCI and PATH values of the new connection entry to be inserted into a sorted connection table.

Figure 14:
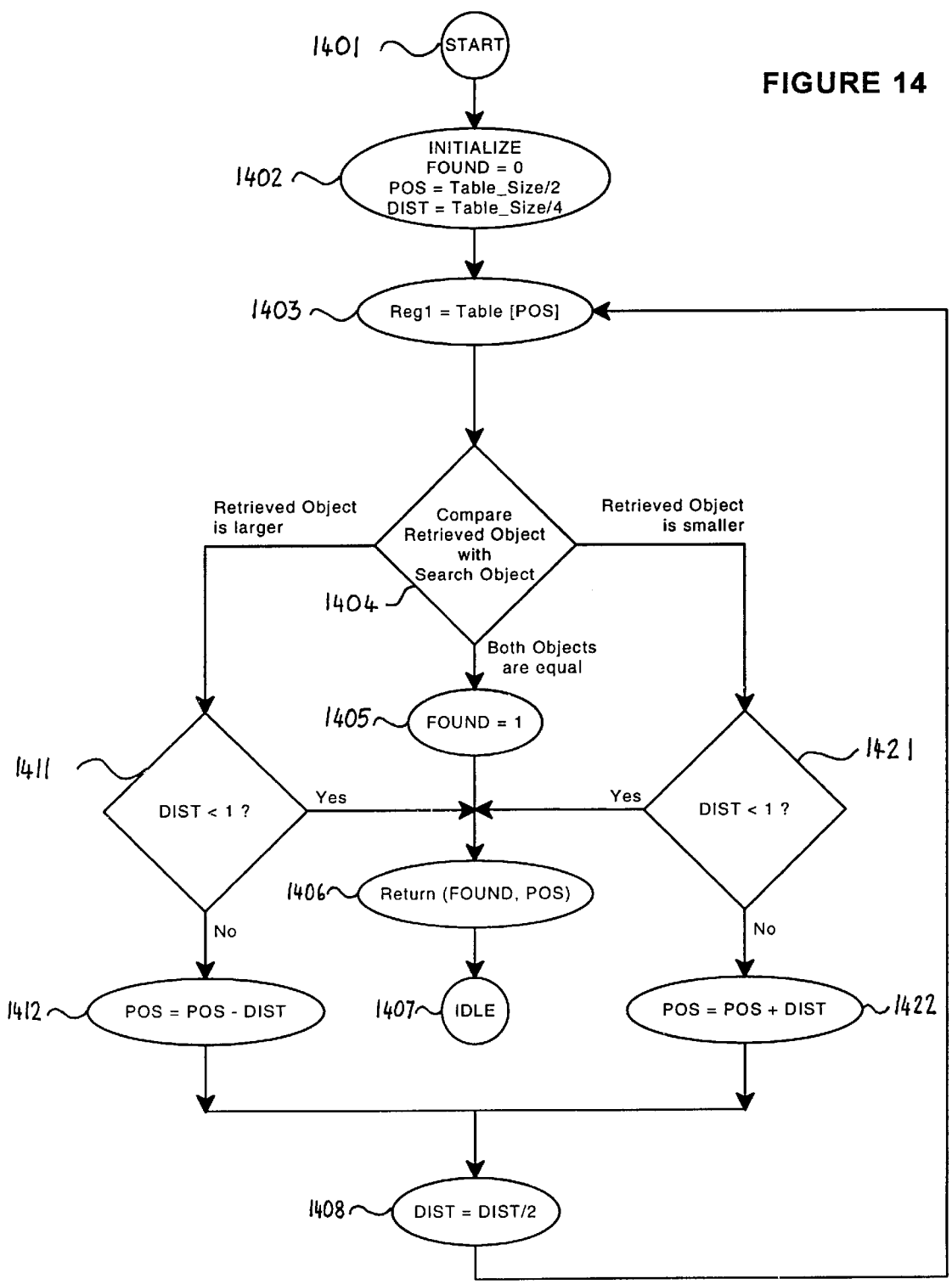
FIG. 14 shows the flow chart of the Look-Up algorithm of the present invention.

The Edit algorithm enters its Searching Phase 1502 where the appropriate insertion point for the new connection entry is determined using the Look-Up process, preferably the binary-search algorithm shown in FIG. 14 (and FIG. 9) and discussed in conjunction therewith. The Look-Up process returns a pointer to the position LOC in the connection table. In an alternative embodiment of the present invention, the Look-Up process additionally generates a flag to indicate whether the correct insertion point for the new connection entry lies above, below or at the connection record at table address LOC (referred to herein as the Search Object).

The connection insertion algorithm next performs a test at 1503 to verify the non-identity of the new connection record being entered (referred to herein as the Entry Object) to the record at the table address LOC that was returned by the Look-Up process (the Search Object).

If the Entry Object is determined at 1503 to be identical to the Search Object, the insertion process generates an error message at 1504 indicating that the Entry Object, the connection desired to be inserted into the connection table, is already an active connection. The insertion process then transitions to the idle state 1505. On the other hand, if the Entry Object is found at 1503 to be not identical to the Search Object, the insertion process branches to the Hole Searching Phase 1506.

In the first part of the Hole Searching Phase 1506, the Search Object (the data record at the table address LOC identified at 1502) is scanned at 1511 to determine whether or not it represents an active connection. If the Search Object is found to be an inactive record (i.e., a "hole"), then the insertion algorithm jumps directly to the Table Update Phase 1509 wherein the hole data record is overwritten with the new connection entry before the insertion algorithm ends with a transition to the idle state 1505.

If, on the other hand, the test at 1511 reveals that the Search Object is not a "hole," then the New_Connection algorithm searches for and locates, at 1512, the hole that is nearest to the Search Object. In one embodiment of the present invention, the location of this "nearest" hole is determined at 1512 using an interleaved linear scan through table addresses that are at steadily increasing distances from the Search Object. The interleaved scan proceeds alternately through table locations that are above and below the Search Object. A variation of this technique involves first looking for a hole on the same side of the Search Object as the desired insertion point, and then proceeding with same interleaved scan as above.

In the preferred embodiment of the present invention, a background process is used to ensure an adequate distribution of holes throughout the connection table. Consequently, a linear search technique has generally been found to be adequate for locating the "nearest" hole. However, it should be emphasized that the location of the "nearest" hole can also be determined by other techniques than the simple linear search technique (e.g., by a table look-up or by using an inter-hole distance parameter).

It should be noted that the search for the nearest hole can sometimes yield two equidistant holes above and below the Search Object. However, given that the Entry Object may sometimes be smaller and sometimes be larger than the Search Object, one of these two equidistant holes may be nearer in fact to the desired insertion point than the other hole. In an extension of the present technique for locating the "nearest" hole, the Hole Search Phase 1506 is begun at the table location just above (or below) the Search Object if the Entry Object is smaller (or greater, respectively) than the Search Object.

After the Hole Searching Phase 1506, the New_Connection algorithm enters the Index Correction Phase 1507 wherein the appropriate insertion pointer is incremented or decremented if the nearest hole and the desired insertion point are on the same side of the Search Object, and left alone if they are on opposite sides.

The Index Correction Phase 1507 thus deals with the special situation that arises when the hole nearest to the Search Object lies on the same side of the Search Object as the desired insertion point. In a such case, the identified "nearest" hole will need to be bubbled up to, but not beyond, the Search Object. In contrast, when the hole and the insertion point lie on opposite sides of the Search Object, the "nearest" hole will need to be bubbled up to and just beyond the Search Object.

In the Index Correction Phase 1507, the New_Connection algorithm first determines at 1521 if the nearest hole is above or below the Search Object. In analytic terms, this equates to a comparison of the variable POS and LOC. It should be emphasized that the composite VPI/VCI/PATH values in the second column of the connection table shown in FIG. 16 are sorted from top to bottom in increasing order. Thus the lower of two records in the connection table will be the one with the larger ADR and VPI_VCI value.

If the nearest hole is found at 1521 to be above (i.e. smaller than) the Search Object (i.e. POS<LOC) and the Entry Object is found at 1531 to be also above (i.e. also smaller than) the Search Object, then the insertion pointer is decremented (i.e., moved upwards in the connection table, in the direction of the nearest hole) at 1532, followed by a transition to the Hole Bubbling Phase 1508.

Likewise, if the nearest hole is found at 1521 to be below (i.e. larger than) the Search Object (i.e. POS>LOC) and the Entry Object is found at 1541 to be also below (i.e. also larger than) the Search Object, then the insertion pointer is incremented (i.e., moved downwards in the connection table, again in the direction of the nearest hole) at 1542, again followed by a transition to the Hole Bubbling Phase 1508.

If the nearest hole and the desired insertion point lie on opposite sides of the Search Object, then the insertion pointer is neither incremented nor decremented; instead, there is a direct transition from the Index Correction Phase 1507 to the Hole Bubbling Phase 1508 from both decision points 1531 and 1541.

It should be emphasized that when a pointer is "incremented," it will point to a lower table address than before. This is because in one embodiment of the present invention, entries in the connection table are arranged in increasing order, with the smallest VPI_VCI value lying at the top of the table. Likewise, when a pointer is "decremented," it will point to a higher table address than before.

The "nearest" hole identified at 1512 is next bubbled up or down (as appropriate) to the desired insertion point in the Hole Bubbling Phase 1508 using the modified bubblesort technique described earlier in conjunction with the discussion of FIG. 10. After this repositioning of the "nearest" hole to the desired insertion point, the connection entry process reaches the same state as if the decision condition at 1511 had been answered in the affirmative, i.e., it transitions to the Table Update Phase 1509.

In this final phase of the New_Connection algorithm, the new connection entry is written over the repositioned hole at 1509 and the Edit process then ends with a transition to the idle state 1505.

An Illustrative Example of the Enhanced Data Entry Process

FIG. 16 illustrates the stages in the data entry sequence during operation of the enhanced insertion algorithm for an exemplary connection table containing sixteen data records, nine of which represent active connections. Assume that a tenth connection record having a composite VPI_VCI value of 22 is to be inserted into the connection table. As can be seen in FIG. 16A, this Entry Object should logically be inserted in between the data records at the table addresses ADR=6 and ADR=7.

FIG. 16A shows an exemplary connection table in an ATM exchange having sixteen records numbered 0, 1, 2, . . . , 15. These sixteen physical location addresses (ADR) are shown in the first column of the table in FIG. 16A.

The second column of the table shows a composite connection identifier obtained by combining the VPI, the VCI and the PATH fields detailed earlier in the specification. The 12-bits of the VPI field can potentially carry 4096 distinct virtual paths, while the 16-bits of the VCI field can potentially identify 65,536 distinct virtual channels. When used in combination, the VPI and the VCI fields thus have an addressable range of $2^{28}$ different address locations (i.e., 268,435,456 different locations). For simplicity of illustration, the various composite VPI/VCI connection identifier shown in FIG. 16 are limited to the range 1–99 in the exemplary illustration shown in FIG. 16A.

The third column of the connection table of FIG. 16A contains a unique connection number (CON) ranging from 0 to 15. It should be noted that the free connection numbers are retained even in the inactive locations (i.e., in "holes"). The connection numbers of the sixteen records are initialized such that the initial CON value of a record is the same as its ADR value. In the preferred embodiment of the present invention, swapping of connection numbers between data records is permitted, although total elimination of a connection number is prohibited. Whenever an active connection record and a "hole" data record are swapped, the VPI/VCI field of the "hole" is set to a value that is smaller than or equal to the VPI/VCI value of the connection record in order to ensure that the table always remains sorted.

The fourth column of the connection table shown in FIG. 16A contains the value of the HOLE flag. As explained earlier, the HOLE flag is asserted (i.e., contains the value 1) if a particular database record represents an inactive connection, and is low (i.e., contains the value 0) when a database record represents an active connection.

The first phase of operation of the enhanced insertion algorithm, the search for the appropriate insertion point for a new connection, is illustrated in FIG. 16A. As can be seen from FIG. 16A, the ADR values in the first column run sequentially from 0 to and through 15, while the VPI/VCI values in the second column monotonically increase from 5 to 99.

In the example illustrated in FIG. 16, the improved insertion algorithm is used to insert the VPI/VCI value 22 into the table. The first phase of the enhanced insertion algorithm, shown in FIG. 16A, begins in the middle of the table (i.e., at ADR=8). Since the VPI/VCI value of this record (26) is greater than the desired VPI/VCI value of the new connection to be inserted (22), the search next jumps to ADR=4, where the VPI/VCI value of the record is found to be less than the desired VPI/VCI value (of 22).

Consequently, the search then proceeds to ADR=6 and finally to ADR=7. The search terminates upon the determination that the Entry Object needs to be inserted between ADR values 6 and 7. At the termination of the search, the insertion pointer is set to point to ADR=7, indicating that the new record is to be inserted just prior to the record that the insertion pointer is pointing to.

In the second phase of the enhanced insertion algorithm, shown in FIG. 16B, a search is performed for the nearest hole to the Search Object (which is at ADR=7). This search reveals that the nearest hole above the Search Object is at ADR=5 while the nearest hole below the Search Object is at ADR=9. Since the former is closer to the desired insertion point, the search for the nearest hole terminates with the hole pointer being set to ADR=5.

In the third phase of the enhanced insertion algorithm (the index correction phase), shown in FIG. 16C, the insertion pointer is decremented by one record position because the nearest hole and the desired insertion point are both above (i.e. smaller than) the Search Object. The rationale behind this index correction was explained earlier, in conjuction with the discussion of the Index Correction Phase 1507 in FIG. 15. Thus, in the example illustrated in FIG. 16C, the insertion pointer is made to point to ADR=6.

In the fourth phase of the enhanced insertion algorithm (the hole repositioning phase), shown in FIG. 16D, the hole at ADR=5 is bubbled down to ADR=6 using, for example, the modified bubblesort technique detailed in FIG. 10.

As detailed earlier, this bubbling down involves replacing the VPI/VCI value of record ADR=5 with the VPI/VCI value stored in record ADR=6. Simultaneously, the HOLE flag of record ADR=6 is asserted while that of record ADR=5 is deasserted. The CON value of the records at table addresses ADR=5 and ADR=6 are swapped to ensure that the connection numbers continue to correspond to the VPI/VCI values of that record, as shown in FIG. 16D.

In the final phase of the enhanced insertion algorithm (the entry of connection phase), shown in FIG. 16E, the new connection having a VPI/VCI value of 22 is inserted into the hole now repositioned at location ADR=6. It should be noted that upon the termination of this enhanced insertion algorithm, the total number of holes decreases by one and a corresponding new connection record at position ADR=6 becomes active.

In the worst-case scenario, this enhanced insertion technique has the same running time as the earlier insertion technique that did not use "holes", but in the average case, it has been found to be substantially faster.

Operational Details of the Enhanced Insertion Algorithm

Figure 17A:
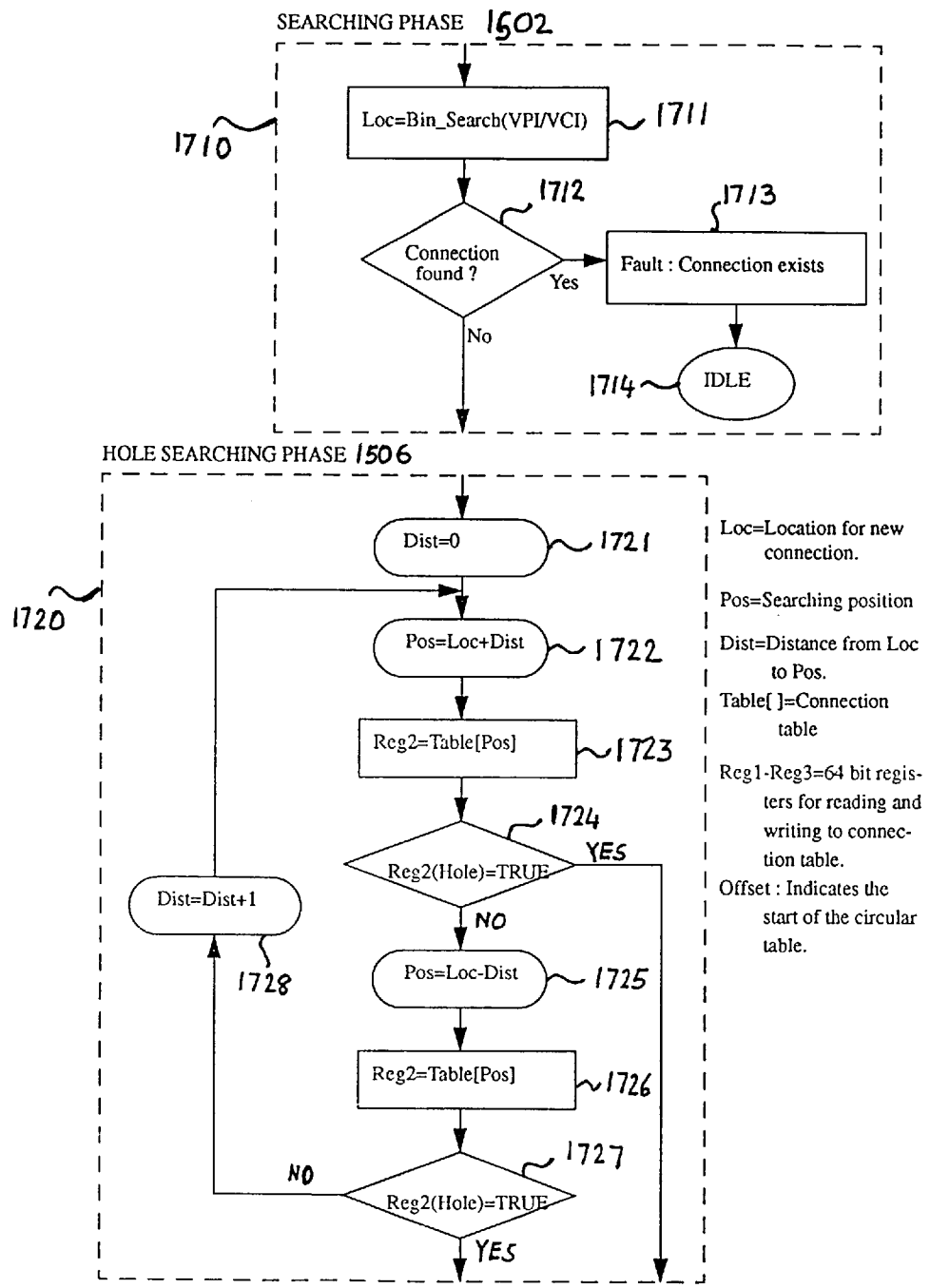
FIGS. 17A–B are a detailed flow chart showing the operation of the enhanced insertion algorithm of the present invention.
Figure 17B:
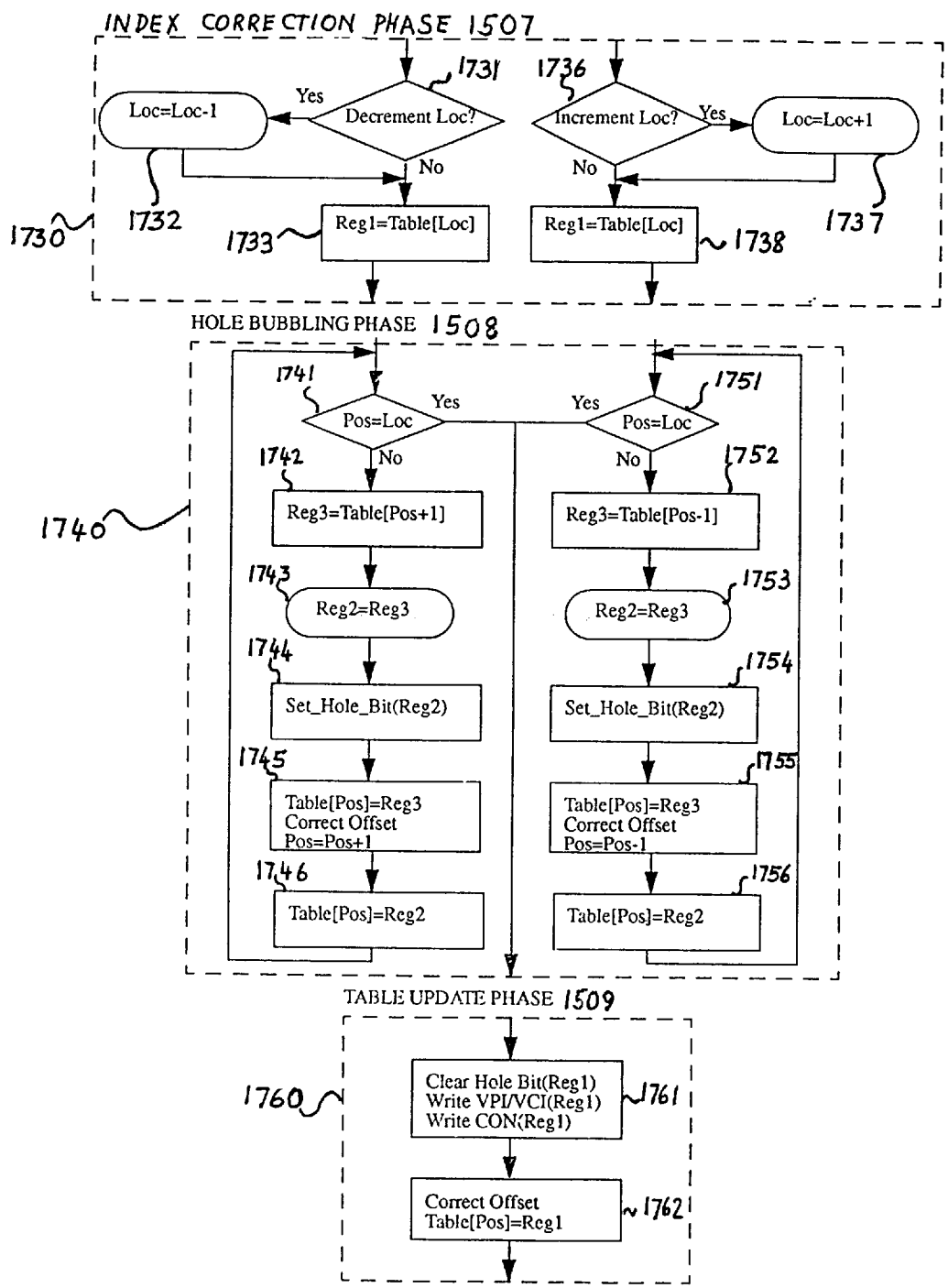

FIGS. 17A and 17B present detailed flow charts of the algorithm used in the preferred embodiment of the present invention to insert new connections into the connection table while maintaining the sort order of the table.

The Look-Up Phase 1502 of the New_Connection algorithm is shown inside the dotted box 1710 and begins at 1711 with a binary-search for Search Object using the VPI/VCI value of the desired Entry Object. The binary-search yields a pointer to a record at the position LOC (referred to as the Search Object). If the Search Object (i.e., the record at the position LOC) is found at 1712 to be an active connection, then the Look-Up routine generates an error message at 1713 indicating that the Entry Object is identical to a currently active connection within the table. In such a case, the insertion algorithm terminates abnormally with a transfer to the idle state 1714.

If, on the other hand, the VPI/VCI value to be inserted into the table (i.e., the Entry Object) does not represent a currently-active connection in the connection table, then the search phase ends gracefully with the transfer of the LOC pointer to the Hole Searching Phase 1506.

The Hole Searching Phase 1506 illustrated inside the dotted box 1720 in FIG. 17A begins with the distance parameter, DIST, being initialized to zero at 1721. The distance parameter represents the distance from the location of the Search Object (i.e., ADR=LOC) to the current position being investigated (i.e., ADR=POS, also referred to as the Retrieved Object). The steps involved in the search for the "nearest" hole that lies below the Search Object is depicted at 1722 to 1724, while the flow chart of a search for the "nearest" hole above the Search Object is shown at 1725 to 1727.

In the preferred embodiment of the present invention, the search for the "nearest" hole comprises a series of interleaved searches for holes at monotonically increasing locations alternately above and below the desired insertion point.

It should be noted that it is not possible to predict whether upon the termination of a binary search for the appropriate insertion point for a new connection record, the new connection will need to be inserted above or below the record last retrieved by the look-up algorithm (i.e. the connection record at the position LOC).

This can be seen from FIG. 16 where a new connection with a VPI_VCI value of 25 would need to be inserted below the record at the position ADR=7 while a new connection with a VPI_VCI value of 23 would need to be inserted above the same record at the position ADR=7. In both cases, an invocation of the Look-Up algorithm will result in the LOC pointer being returned with an (ADR) value of 7. Thus it can be seen that the desired insertion point for a new connection entry lie can sometimes be above and sometimes be below the Search Object (the record at position ADR=LOC).

The Hole Searching Phase 1506 begins with a scan at 1722 and 1723 of the record immediately below the Search Object. If this location is found to be a hole at 1724, then the Hole Searching Phase 1506 terminates gracefully with a transfer to the Index Correction Phase 1507. If, on the other hand, the data record immediately below the Search Object is found not to be a hole, a similar scan is performed of the record immediately above the Search Object as shown at 1725 and 1726. If the record at the location immediately above the Search Object is found to be a hole at 1727, then the Hole Searching Phase 1506 again terminates gracefully with a transfer to the Index Correction Phase 1507.

If neither of the locations immediately above and below the Search Object is found to contain a hole, then the distance parameter, DIST is incremented by one, as shown at 1728, and a similar scan is performed at the table locations that are two record positions below and above the desired insertion point as shown at 1722 to 1727. This process is repeated until the Hole Searching Phase 1506 terminates with the identification of a hole as being the nearest to the Search Object.

The Index Correction Phase 1507 of the enhanced insertion algorithm is shown inside the dotted box 1730 in FIG. 17B. If the "nearest" hole is above the Search Object and if the Entry Object and the nearest hole are found at 1731 to be on the same side of the Search Object, then the LOC pointer is decremented at 1732 and the data record at this decremented location is retrieved into register Reg1 at 1733. The process then transfers gracefully to the Hole Bubbling Phase 1508.

If the "nearest" hole is below the Search Object, and if the Entry Object and the nearest hole are found at 1736 to be again on the same side of the Search Object, then the LOC pointer is incremented at 1737, and the data record corresponding to this incremented LOC pointer is retrieved into register Reg1 at 1738. As in the earlier case, this brings the Index Correction Phase 1507 to a graceful end and results in a transfer to the Hole Bubbling Phase 1508.

When the Entry Object and the "nearest" hole are found to be on opposite sides of the Search Object, then the insertion pointer LOC is neither incremented nor decremented at 1731 or 1736. However, as before, the Index Correction Phase 1507 comes to a graceful end with the data record corresponding to the unchanged LOC pointer being retrieved into register Reg1 at 1733 and 1738 respectively. As in the other two cases, this is followed by a transfer to the Hole Bubbling Phase 1508.

The Hole Bubbling Phase 1508 is depicted inside the dotted box 1740 in FIG. 17B. If the nearest hole is found to lie below the Search Object, then steps 1741 to 1746 are iteratively repeated until the identified hole has been repositioned to the desired insertion point. If on the other hand, the nearest hole is found to lie above the Search Object, then iterative steps 1751 to 1756 are repeated until the identified hole has been repositioned to the desired insertion point.

As can be seen from FIG. 17B, the alternative Hole Bubbling Phase 1508 for a "nearest" hole that is above the Search Object begins with an evaluation of whether the hole being repositioned has reached the desired insertion point. This is illustrated at 1741 and if answered in the affirmative, causes a graceful transfer from the Hole Bubbling Phase 1508 to the Table Update Phase 1509.

On the other hand, if the "nearest" hole has not yet been fully repositioned, then the data record just below the hole is retrieved into a register Reg3 at 1742. This data record is also copied from register Reg3 to register Reg2 at 1743. Next the HOLE bit of register Reg2 is set at 1744. The data record in register Reg3 is then copied to the old position of the hole. The offset pointer is then corrected as shown at 1745 and the pointer to the next data record to be swapped with the hole is incremented. Finally the data record in register Reg2 is copied at 1746 to the table at the prior location of the hole (i.e., at location ADR=POS).

FIG. 17B also illustrates the analogous hole bubbling phase for holes lying below the Search Object. This begins with an evaluation of whether the hole being repositioned has reached the desired insertion point. This is illustrated at 1751 and if answered in the affirmative, causes a graceful transfer from the Hole Bubbling Phase 1508 to the Table Update Phase 1509.

On the other hand, if the hole has not yet been fully repositioned, then the data record just above the hole is retrieved into a register Reg3 at 1752. This data record is also copied from register Reg3 to register Reg2 at 1753. Next the HOLE bit of register Reg2 is set at 1754. The data record in register Reg3 is then copied to the prior location of the hole. The offset pointer is then corrected as shown at 1755 and the pointer to the next data record to be swapped with the hole is decremented. Finally the data record in register Reg2 is copied at 1756 to the table at the prior location of the hole (i.e., at location ADR=POS).

The final phase of the enhanced insertion algorithm is the Table Update Phase 1509 which is shown inside the dotted box 1760 in FIG. 17B. In this phase, the HOLE bit of register Reg1 is cleared at 1761 and the VPI/VCI values of the new connection to be inserted into the table (the Entry Object) are retrieved into a register Reg1. The value of the connection number CON of the repositioned hole is also retrieved into the register Reg1 at 1761.

The offset value is then corrected at 1762 if the connection table is implemented as a circular table. Finally the data record in register Reg1 is written back into the table at location ADR=POS as shown at 1762. This brings the Table Update Phase 1608 to an end and completes the insertion of the new connection record at the proper position within the connection table.

Connection Removal Using the Edit Algorithm

To remove a connection, the binary-search algorithm is first used to find the location of the connection to be removed. Next the HOLE bit of the identified record is asserted (i.e., set to 1). As can be seen, no moving of data records is now necessary—in contrast to the situation where the disused data records had to be bubbled to one end of the table.

Figure 18:
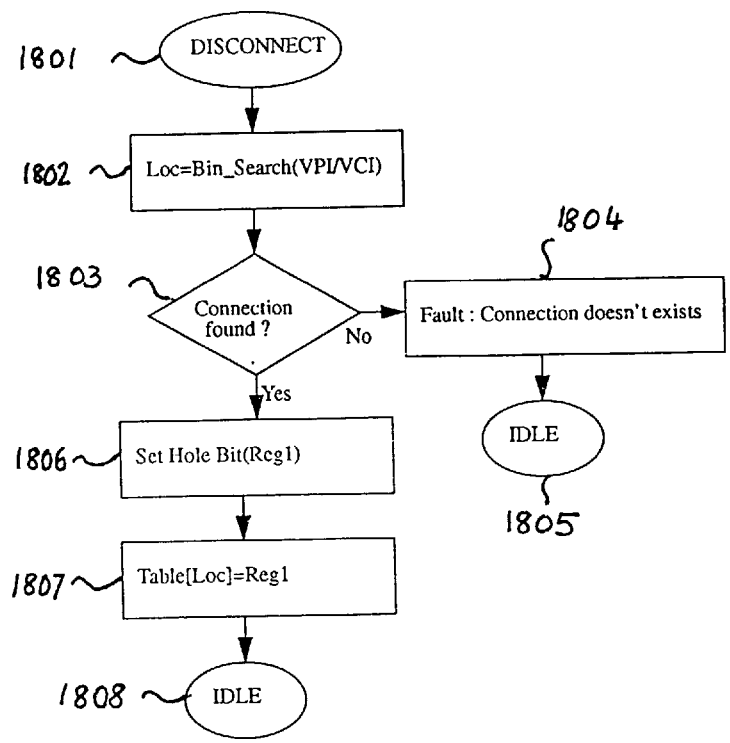
FIG. 18 shows a flow chart of the enhanced connection removal algorithm of the present invention.

FIG. 18 shows the flow chart of the Connection Removal algorithm (called Disconnect) used to take down connections. The Disconnect algorithm is invoked at 1801 and provided with the VPI/VCI values of the connection to be taken down. These VPI/VCI values are provided as inputs to the Look-Up algorithm at 1802. The binary search-based Look-Up algorithm will return, upon successful termination, a pointer to the address of the connection to be taken down (ADR=LOC).

Next this data record is retrieved into a register Reg1 and its HOLE flag is evaluated at 1803 to determine whether or not it represents an active connection. If the record at the location ADR=LOC is not an active connection, the Disconnect algorithm generates an error message at 1804 indicating that the desired connection which is to be taken down either does not exist or is currently inactive. After generating this error message, the Disconnect algorithm transitions into its idle state 1805.

If on the other hand, the test at 1803 results in a determination that the record at the location ADR=LOC is an active connection, then the HOLE bit of this data record is asserted (i.e., set to 1) at 1806. Next the corrected (i.e., inactivated) data record in register Reg1 is written back into the table at the location ADR=LOC at 1807. The Disconnect algorithm then transitions to the idle state 1808 and terminates operation.

The worst case running time for this algorithm is equal to two clock cycles more than the worst case running time for binary search(i.e., is $\log_2 N+2$ cycles). This represents a really significant improvement over the running times of earlier implementations of the Data Removal algorithm, especially in situations where the table contains a large number of connections.

Hole Distribution Using the Background Algorithm

Selection Criteria:

When several new connections have been established, it is possible that a large number of connections are adjacent to each other with no holes separating them. To ameliorate such a blocking of connections, it is desirable to have a Hole Distribution process. Such a Hole Distribution process can make the distribution of connections and holes in the connection table as even as possible. Ideally, the Hole Distribution algorithm should run as a background process that is active only when no other processes are running. Whenever an ATM cell arrives, the background process must be capable of being interrupted until the processing of the incoming cell has been completed.

In the selection of such a background process, there are three important factors:

1) Even Distribution of Holes Over the Table: It is desirable that at all times there be holes between every pair of connection records in the table, so that the insertion process needs to reposition as few data records as possible when new connections are established. A background process for distributing the holes as much as possible has been described earlier in this specification. This background process distributes the connection records in the table evenly so that there are equal numbers of holes between every contiguous block of active connections.

2) Invariance of the VPI/VCI-Probability Distribution: It is desirable that the probability distribution of the VPI/VCI values of the incoming ATM cells be the same as the probability distribution of the VPI/VCI values already in the table.

This is best explained by an example. Let us assume that the VPI/VCI values initially in the connection table are uniformly distributed over the whole address range from 0 to $2^{28}$, but that the incoming VPI/VCI values are generated according to a uniform probability distribution in the address range from 0 to $2^{27}$. The new connections will then exclusively be located in the lower part of the table, because the addresses of the values in the upper part of the table will be above $2^{27}$.

In the absence of a background process the probability distributions of the incoming cells and the table contents will be relative equal (unless the probability distribution of the incoming VPI/VCI values changes) because the VPI/VCI values in the table are exclusively generated by the incoming cells. Consequently, a background process that moves holes, must change some VPI/VCI values if the table is to remain sorted at all times.

This means that if the background process is active, the probability distribution of incoming ATM-cells can be dynamically different from the probability distribution of the VPI/VCI values that are already in the connection table.

3) Table Fill Fraction: It has been found that some background algorithms are not suitable for tables having only a few connections, while others are ineffective when handling tables filled to more than 50% with active connections.

It is not possible to simultaneously satisfy both the first and the second criteria. Consequently one needs to make tradeoffs in selecting an appropriate hole distribution algorithm. The second criterion favors algorithms which do not radically change the probability distribution of VPI/VCI values in the table. The background algorithm described below is one such process. It only moves holes when two consecutive connections need to be separated.

The Background Algorithm

The implementation of a circular table (described further on in this specification) reduces the importance of determining the ideal location for a connection data record. It becomes unnecessary to know the direction in which there is an excess of holes, when the table no longer has a top or a bottom where the connections can get clustered.

This process begins with the examination of three consecutive data records from the table. If two connection records are found to be adjacent to a hole data record, then the hole data record and the neighboring connection record are swapped. Otherwise, the next element is retrieved and a new three-element window is prepared for analysis. This three-position sliding scan traverses the entire table form one end to the other. After all the connections have been examined, the process begins anew.

Figure 19:
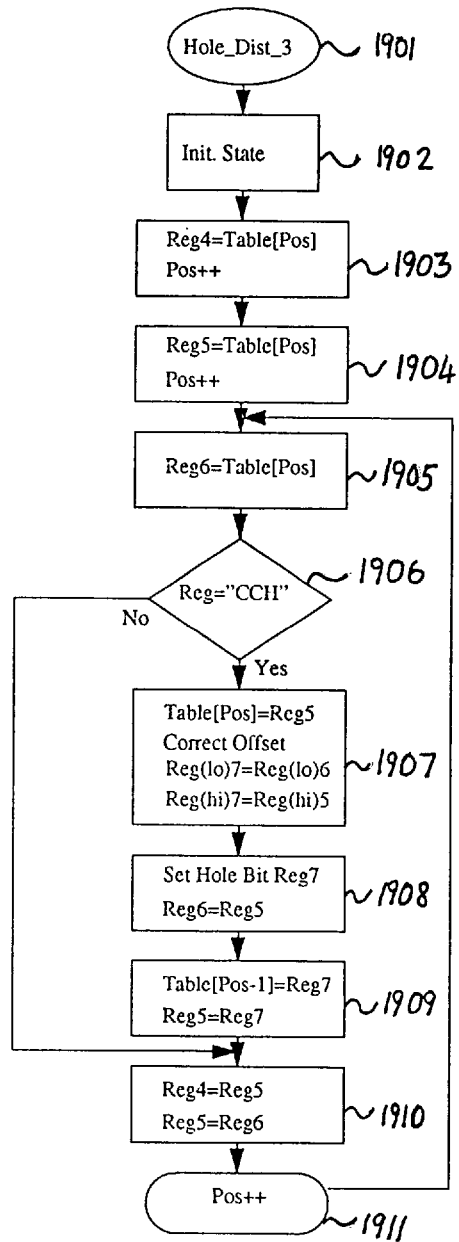
FIG. 19 shows a flow chart of the background algorithm used for recycling and repositioning holes in one embodiment of the present invention.

The flow chart of this Background Hole Distribution algorithm is shown in FIG. 19. The following parameters have been used in the flow chart:

Reg4–Reg6: These are 64-bit registers for reading and writing to the connection table.

Table[ ]: This is the connection table.

POS: This is the pointer to the current table position.

Reg: This register is used to check the contents of connection records in registers Reg4, Reg5 and Reg6. It should be noted that Reg=<<CCH>> means that registers Reg4 and Reg5 contain connections and Reg6 contains a hole, while Reg=<<HCC>> means that Reg4 contains a hole and Reg5 and Reg6 contain connections.

Reg(lo): This refers to the lowest 32-bits of each register, which contains, inter alia, the CON-field.

Reg(hi): This refers to the highest 32-bits of each register, which contains, inter alia, the VPI/VCI-field and the HOLE-field.

Offset: This indicates the start of the connection table (i.e., the connection record containing the smallest VPI/VCI value).

FIG. 19 shows the flow chart of the background algorithm used for repositioning holes for efficient operation of the connection table. The background algorithm (called Hole__Dist__3) is invoked at 1901. This is followed at 1902 with the initialization of various state variables, that are not pertinent to the discussion of the subject invention.

The data record at the table address ADR=POS is then retrieved into register Reg4 at 1903. The position pointer POS is also incremented by one at the same time. The data record at the next higher table position is then retrieved into register Reg5 at 1904 followed by a second incrementing of the pointer POS. The next data record is then retrieved into register Reg6 at 1905.

The HOLE flags of the data records in registers Reg4, Reg5 and Reg6 are then analyzed at 1906 to determine whether they carry the pattern "CCH" (i.e., comprise two connections followed by a hole). If this question is answered in the negative, the processing jumps to step 1910 where the contents of registers Reg4 and Reg5 are overwritten successively with the contents of registers Reg5 and Reg6, respectively. If the test at 1906 is answered in the affirmative, the background algorithm proceeds with the data record in register Reg5 being written into the table location ADR=POS (i.e., the former location of the contents of register Reg6).

This is shown at 1907 where the offset is also corrected, followed by the move of the lowest 32-bits of register Reg6 to the lower portion of register Reg7 and the simultaneous move of the higher 32-bits of register Reg5 to the higher position of register Reg7. Next the HOLE bit of register Reg7 is set at 1905 followed by overwriting of the contents of register Reg6 with the contents of register Reg5.

The composite contents of register Reg6 created at 1907 is then written at 1909 into the table at one location lower than the current location pointed to by the pointer POS simultaneously, the contents of register Reg5 are overwritten with the contents of register Reg7.

The processing then continues as described earlier from 1910 where the contents of registers Reg4 and Reg5 are overwritten successively with the contents of register Reg5 and Reg6, respectively. This is followed by the incrementing of the position pointer POS at 1911 followed by a jump back to step 1905.

It should be noted that no termination conditions are shown in FIG. 19 because the hole distribution process is perpetually active. As noted earlier, this process is accorded the lowest execution priority by the connection table manager and hence it is active only when all other processes are silent.

Circular Table Implementation

The implementation of the connection table as a circular table can prevent clustering of holes at the beginning and the end of the table, and can also simplify the hardware circuitry. When the insertion process searches for holes, some problems may arise at the beginning and the end of the table.

For example, the New_Connection algorithm searches for holes above and below the desired insertion point in the connection table. If the desired insertion point is near the top or the bottom of the table it is possible that the process may try to search outside the table for a hole, unless prevented from doing so by a check routine in the background algorithm.

A better way to solve this problem would be to use a circular table employing a modulo addressing mechanism. This results in a table having neither a top nor a bottom. A circular table needs only an offset pointer to the smallest element in the table. In the preferred embodiment of the subject invention, the increment/decrement calculations are performed using the following formulae:

(Increment):
POS<=(POS+1+Table_Size) mod (Table_Size)
LOC<=(LOC+1+Table_Size) mod (Table_Size)
(Decrement):
POS<=(POS-1+Table_Size) mod (Table_Size)
LOC<=(LOC-1+Table_Size) mod (Table_Size)

Offset pointer calculations can be performed using the following formulae:

If the smallest-valued VPI/VCI connection is disconnected then:
Offset<=(Offset+1+Table_Size) mod (Table_Size)
If a new connection is positioned below the smallest valued VPI/VCI connection then:
Offset<=(Offset-1+Table_Size) mod (Table_Size)

The superiority of a circular connection table over a linear table derives from the fact that with the former, one does not need to check to verify that the position pointer is within range (i.e., it is not outside pointing the start or the end of the table).

Further, the use of a circular table does not result in clustering effects at the start or the end of the table. In contrast, in a linear table implementation, there may be a greater distribution of connections at the start and the end of the table, because the movement of holes is often restricted in that region of the table.

The disadvantage of a circular table over a linear table follows from its need for a pointer to the lowest VPI/VCI value in the table. Such a pointer will continually need to be updated, thus requiring some additional operations over that which would have been necessary in a linear table implementation.

Advantages of the Subject Invention

Analyses and simulations at a clock frequency of 20 MHz and a transmission rate of 155 Mbits/second show that an implementation of holes in the connection table may typically improve the average expected updating time with a factor of about 10000 compared to the performance using the modified bubblesort technique detailed earlier.

At a transmission rate of 155 Mbits/second the updating of new connections can be performed without any problems. This is also true under "almost worst-case" conditions. At transmission rates of 622 Mbits/second some problems may appear if the VPI/VCI probability distribution changes suddenly and dramatically, but under normal conditions updating can be performed without any problems. At a transmission rate of 2.4 Gbits/second a higher clock frequency (of 90 MHZ) is needed for the algorithm to work properly.

The searching algorithm and the data removal algorithm described in this specification are relatively simple algorithms, that are easy to implement in a DSP or an ASIC.

The insertion algorithm is a bit more complicated than the pure bubblesort algorithm, but still does not pose any implementational problems. Implementation of a circular table simplifies the algorithm further. The updating of the offset pointer (which is a pointer to the stare of the connection table) is the most critical and advanced part of such an implementation.

The enhanced algorithm that is the subject of the present patent application needs a table that is oversized by no more than two-fold. This means that the maximum number of connections allowed in the connection table should be about half the table size. This relatively limited oversize factor permits total system integration on one chip. A table containing 8192 64-bit data records (capable of handling about 4096 connections) requires a 64 Kbyte RAM. It is already feasible to integrate a table of such a size on to an ASIC.

The algorithms described herein work well over the entire 28-bit global addressing range of ATM cells. However, if the addressing range probability distribution varies dynamically as noted earlier, some updating problems may appear at high transmission rates.

The use of a binary search algorithm ensures that a mapping from VPI/VCI to CON can be performed in a maximum of 13 clock cycles (12 clock cycles in the average case) assuming a table CON 8192 records. The Data Removal algorithm too has a predictable maximum access time (15 clock cycles). The Data Insertion algorithm has no predictable maximum access time, but assuming uniform probability distribution of VPI/VCI values in the range from 0 to $2^{28}$ the expected number of clock cycles used by the insertion algorithm is likely to be below 30. It is very unlikely that the Data Insertion algorithm will take more time than this to add a new connection entry. Even under worst-case conditions (e.g., maximum load) with a transmission rate of 622 Mbits/second and a clock frequency of 23 MHz, the available number of clock cycles for one data insertion is more than 1000. This means that on the average, the insertion algorithm will use up only 3% of the available clock cycles even under conditions of maximum traffic load.

Because of the limited oversize factor needed and because a doubling of the table size only increases the searching time by one clock cycle, it is clear that increases in the table size or in the maximum number of connections are unlikely to pose problems. Assuming that the ratio between the maximum number of connections and the table size remains the same as before, the insertion time will climb with an increase in the number of connections.

The operation of the background process will be affected by an increase in the table size because the time cost of examining the whole table is directly proportional to the size of the table. This means that with an increase in the table size, it will take longer between passes of the background process over parts of the table where it is most needed. This may create some problems but only if the VPI/VCI probability distribution varies dynamically—which is unlikely under normal operating conditions.

The concept of ranging involves the set-up of a "START" connection address and a "STOP" connection address, and the assignment of all VPI/VCI values between the two addresses to a single connection number (that is stored at either the START or STOP entry). This can be easily implemented using the system and method of the present invention, since it uses a sorted table. The use of ranging will, however result in a slightly extended Look-Up algorithm, and modifications to some of the other algorithms, since we now have to deal with a new class of table objects.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. A method of adding a new connection entry to a connection table in an Asynchronous Transfer Mode (ATM) exchange, said connection table comprising a plurality of data records, each of said data records representing connection information relating to a group of one or more ATM cells associated with a specific connection and further comprising the global address of the group of ATM cells, said method comprising the steps of:

mapping the global address of a group of ATM cells to a local address that is specific to the ATM exchange;

creating a connection table correlating the global address of each of said group of ATM cells to its local address;

incorporating a plurality of holes in said connection table, each of said holes being a dummy data record representing an inactive connection; and adding an entry to said connection table corresponding to a new connection using a data insertion algorithm further comprising the following sub-steps:

identifying the appropriate insertion point in said connection table for a new connection entry using a look-up algorithm;

locating the nearest hole to said identified insertion point;

using an enhanced bubblesort algorithm to reposition said nearest hole to said appropriate insertion point while maintaining said connection table in a fully sorted order; and writing the new connection entry over said repositioned hole.

2. The method of claim 1 for adding a new connection entry to a connection table in an ATM exchange wherein said global address of each group of ATM cells that belong to the same connection comprises a 12-bit Virtual Path Identifier (VPI) portion and a 16-bit Virtual Channel Identifier (VCI) portion.

3. The method of claim 1 for adding a new connection entry to a connection table in an ATM exchange wherein said global address of each group of ATM cells that belong to the same connection comprises a 8-bit Virtual Path Identifier (VPI) portion and a 16-bit Virtual Channel Identifier (VCI) portion.

4. The method of claim 1 for adding a new connection entry to a connection table in an ATM exchange wherein the local address of each group of ATM cells that belong to the same connection includes a 12-bit Connection Number (CON) value.

5. The method of claim 1 for adding a new connection entry to a connection table in an ATM exchange wherein said local address of each group of ATM cells that belong to the same connection additionally identifies data entries having unique VPI values.

6. The method of claim 5 for adding a new connection entry to a connection table in an ATM exchange wherein said identification of data entries having unique VPI values is performed using a binary flag.

7. The method of claim 1 for adding a new connection entry to a connection table in an ATM exchange wherein said look-up algorithm is a binary search algorithm.

8. The method of claim 1 for adding a new connection entry to a connection table in an ATM exchange wherein said nearest hole to the identified insertion point is located by a monotonic linear search starting at said identified insertion point.

9. The method of claim 1 for adding a new connection entry to a connection table in an ATM exchange wherein said nearest hole to the identified insertion point is located by an interleaved linear search starting outward from said identified insertion point and proceeding through successive data records increasingly distant from said identified insertion point and alternately falling above and below said identified insertion point.

10. The method of claim 1 for adding a new connection entry to a connection table in an ATM exchange wherein said connection table is implemented as a circular table.

11. A method of deleting a connection entry from a connection table in an Asynchronous Transfer Mode (ATM) exchange, said connection table comprising a plurality of data records, each of said data records representing connection information relating to a group of one or more ATM cells associated with a specific connection and further comprising the global address of the group of ATM cells, said method comprising the steps of:

mapping the global address of a group of ATM cells to a local address that is specific to the ATM exchange;

creating a connection table correlating the global address of each of said group of ATM cells to its local address; and deleting an entry in said connection table corresponding to an inactivated connection using a data deletion algorithm further comprising the following sub-steps:

locating the entry that is to be deleted from said connection table using a look-up algorithm; and converting said identified connection entry to be deleted into a hole, said hole being a dummy data record representing an inactive connection.

12. The method of claim 11 for deleting an entry in a connection table of an ATM exchange wherein said data deletion algorithm takes as its input a pointer to the data record to be deleted, said pointer being automatically generated upon a failure of the data entry algorithm to add a connection because a requested new connection is found to be identical to a preexisting entry in the connection table.

13. The method of claim 11 for deleting an entry in a connection table of an ATM exchange wherein said connection table is implemented as a circular table.

14. A method of managing a connection table in an Asynchronous Transfer Mode (ATM) exchange, said connection table comprising a plurality of data records, each of said data records representing connection information relating to a group of one or more ATM cells associated with a specific connection and further comprising the global address of the group of ATM cells, said method comprising the steps of:

mapping the global address of a group of ATM cells to a local address that is specific to the ATM exchange;

creating a connection table correlating the global address of each of said group of ATM cells to its local address;

incorporating a plurality of holes in said connection table, each of said holes being a dummy data record representing an inactive connection, the relative spacing and the absolute position of the set of holes within the active connections of the connection table being optimized for facilitating the efficient addition of new connection entries using a hole distribution algorithm;

using a binary search-based look-up algorithm to locate entries in said connection table;

adding one or more entries to said connection table, each of said entries corresponding to a new connection using a data insertion algorithm that operates while maintaining said connection table in a fully sorted order; and deleting one or more entries of said connection table each of said entries corresponding to an inactivated connection using a data deletion algorithm that operates while maintaining said connection table in a fully sorted order.

15. The method of claim 14 for managing a connection table in an ATM exchange wherein said step of adding entries to said connection table is performed using an enhanced bubblesort algorithm.

16. The method of claim 14 for managing a connection table in an ATM exchange wherein said step of deleting entries from said connection table is performed using an enhanced bubblesort algorithm.

17. The method of claim 14 for managing a connection table in an ATM exchange wherein said connection table is implemented as a circular table.

18. A system for adding a new connection entry to a connection table in an Asynchronous Transfer Mode (ATM) exchange, said connection table comprising a plurality of data records, each of said data records representing connection information relating to a group of one or more ATM cells associated with a specific connection and further comprising the global address of the group of ATM cells, said system comprising:

means for mapping the global address of a group of ATM cells to a local address that is specific to the ATM exchange;

means for creating a connection table correlating the global address of each of said group of ATM cells to its local address;

means for incorporating a plurality of holes in said connection table, each of said holes being a dummy data record representing an inactive connection; and means for adding an entry to said connection table corresponding to a new connection using a data insertion algorithm further comprising the following means:

means for identifying the appropriate insertion point in said connection table for a new connection entry using a look-up algorithm;

means for locating the nearest hole to said identified insertion point;

means for using an enhanced bubblesort algorithm to reposition said nearest hole to said appropriate insertion point while maintaining said connection table in a fully sorted order; and means for writing the new connection entry over said repositioned hole.

19. The system of claim 18 for adding a new connection entry to a connection table in an ATM exchange wherein said global address of each group of ATM cells that belong to the same connection comprises a 12-bit Virtual Path Identifier (VPI) portion and a 16-bit Virtual Channel Identifier (VCI) portion.

20. The system of claim 18 for adding a new connection entry to a connection table in an ATM exchange wherein said global address of each group of ATM cells that belong to the same connection comprises a 8-bit Virtual Path Identifier (VPI) portion and a 16-bit Virtual Channel Identifier (VCI) portion.

21. The system of claim 18 for adding a new connection entry to a connection table in an ATM exchange wherein the local address of each group of ATM cells that belong to the same connection includes a 12-bit Connection Number (CON) value.

22. The system of claim 18 for adding a new connection entry to a connection table in an ATM exchange wherein said local address of each group of ATM cells that belong to the same connection additionally identifies data entries having unique VPI values.

23. The system of claim 22 for adding a new connection entry to a connection table in an ATM exchange wherein said means for identification of data entries having unique VPI values additionally comprises binary flag means.

24. The system of claim 18 for adding a new connection entry to a connection table in an ATM exchange wherein said look-up algorithm is a binary search algorithm.

25. The system of claim 18 for adding a new connection entry to a connection table in an ATM exchange wherein said nearest hole to the identified insertion point is located by a monotonic linear search starting at said identified insertion point.

26. The system of claim 18 for adding a new connection entry to a connection table in an ATM exchange wherein said nearest hole to the identified insertion point is located by an interleaved linear search starting outward from said identified insertion point and proceeding through successive data records increasingly distant from said identified insertion point and alternately falling above and below said identified insertion point.

27. The system of claim 18 for adding a new connection entry to a connection table in an ATM exchange wherein said connection table is implemented as a circular table.

28. A system of deleting a connection entry from a connection table in an Asynchronous Transfer Mode (ATM) exchange, said connection table comprising a plurality of data records, each of said data records representing connection information relating to a group of one or more ATM cells associated with a specific connection and further comprising the global address of the group of ATM cells, said system comprising:

means for mapping the global address of a group of ATM cells to a local address that is specific to the ATM exchange;

means for creating a connection table correlating the global address of each of said group of ATM cells to its local address; and means for deleting an entry in said connection table corresponding to an inactivated connection using a data deletion algorithm further comprising the following means:

means for locating the entry that is to be deleted from said connection table using a look-up algorithm; and means for converting said identified connection entry to be deleted into a hole, said hole being a dummy data record representing an inactive connection.

29. The system of claim 28 for deleting an entry in a connection table of an ATM exchange wherein said data deletion algorithm takes as its input a pointer to the data record to be deleted, said pointer being automatically generated upon a failure of the data entry algorithm to add a connection because a requested new connection is found to be identical to a preexisting entry in the connection table.

30. The system of claim 28 for deleting an entry in a connection table of an ATM exchange wherein said connection table is implemented as a circular table.

31. A system for managing a connection table in an Asynchronous Transfer Mode (ATM) exchange, said connection table comprising a plurality of data records, each of said data records representing connection information relating to a group of one or more ATM cells associated with a specific connection and further comprising the global address of the group of ATM cells, said system comprising:

means for mapping the global address of a group of ATM cells to a local address that is specific to the ATM exchange;

means for creating a connection table correlating the global address of each of said group of ATM cells to its local address;

means for incorporating a plurality of holes in said connection table, each of said holes being a dummy data record representing an inactive connection, the relative spacing and the absolute position of the set of holes within the active connections of the connection table being optimized for facilitating the efficient addition of new connection entries using a hole distribution algorithm;

means for using a binary search-based look-up algorithm to locate entries in said connection table;

means for adding one or more entries to said connection table each of said entries corresponding to a new connection using a data insertion algorithm that operates while maintaining said connection table in a fully sorted order; and means for deleting one or more entries of said connection table each of said entries corresponding to an inactivated connection using a data deletion algorithm that operates while maintaining said connection table in a fully sorted order.

32. The system of claim 31 for managing a connection table in an ATM exchange wherein said means for adding entries to said connection table further comprises an enhanced bubblesort algorithm.

33. The system of claim 31 for managing a connection table in an ATM exchange wherein said means for deleting entries from said connection table further comprises an enhanced bubblesort algorithm.

34. The system of claim 31 for managing a connection table in an ATM exchange wherein said connection table is implemented as a circular table.

\* \* \* \* \*

UNITED STATES PATENT AND TRADEMARK OFFICE
CERTIFICATE OF CORRECTION

PATENT NO. : 5,884,297  
DATED : March 16, 1999  
INVENTOR(S) : Noven

It is certified that error appears in the above-identified patent and that said Letters Patent is hereby corrected as shown below:

Title page,  
Item [75], Inventor, replace "Geir Age Noven" with -- Geir Åge Noven --  
Item [21], Appl. No., replace "862,919" with -- 08/862,919 --  
Item [57], ABSTRACT, line 2, replace "request" with -- requests --  
Item [57], line 3, replace "This" with -- The --  
Item [57], line 13, replace "request" with -- requests --  
Item [57], line 16, replace "a database" with -- the database --  
Item [57], line 21, replace "intersection" with -- insertion --  
Item [57], line 24, after "interleaved with" delete -- the --

Column 4,  
Line 11, before "are quite" delete -- id --

Column 17,  
Line 1, replace "earlier-field" with -- earlier-filed --

Column 32,  
Lines 50-51, replace "POS simultaneously" with -- POS. Simultaneously --

Column 34,  
Line 5, replace "stare" with -- start --

Signed and Sealed this

Twenty-fifth Day of December, 2001

*Attest:*

JAMES E. ROGAN  
*Attesting Officer*     *Director of the United States Patent and Trademark Office*